(12) United States Patent
Fukumoto et al.

(10) Patent No.: US 7,277,939 B2
(45) Date of Patent: Oct. 2, 2007

(54) SITE EVALUATION SYSTEM AND SITE EVALUATION PROGRAM STORAGE MEDIUM

(75) Inventors: Masafumi Fukumoto, Kawasaki (JP); Takeshi Kumazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/593,060

(22) Filed: Nov. 6, 2006

(65) Prior Publication Data
US 2007/0055773 A1 Mar. 8, 2007

Related U.S. Application Data

(62) Division of application No. 10/338,667, filed on Jan. 9, 2003, now Pat. No. 7,222,171.

(30) Foreign Application Priority Data
Jul. 23, 2002 (JP) .............................. 2002-213615

(51) Int. Cl.
*G06F 15/173* (2006.01)
*G06F 15/177* (2006.01)
(52) U.S. Cl. .................................................... 709/224
(58) Field of Classification Search ................ 709/224, 709/220; 707/10
See application file for complete search history.

(56) References Cited

U.S. PATENT DOCUMENTS

| 5,951,642 | A | * | 9/1999 | Onoe et al. | .................. | 709/224 |
| 6,393,479 | B1 | * | 5/2002 | Glommen et al. | ........... | 709/224 |
| 6,704,732 | B1 | * | 3/2004 | Barclay | ........................ | 707/10 |
| 6,804,701 | B2 | * | 10/2004 | Muret et al. | ................. | 709/203 |
| 2002/0147772 | A1 | * | 10/2002 | Glommen et al. | ........... | 709/203 |
| 2002/0186237 | A1 | * | 12/2002 | Bradley et al. | .............. | 345/736 |
| 2003/0182420 | A1 | * | 9/2003 | Jones et al. | .................. | 709/224 |
| 2004/0088407 | A1 | * | 5/2004 | Boyd et al. | .................. | 709/224 |
| 2004/0260807 | A1 | * | 12/2004 | Glommen et al. | ........... | 709/224 |

FOREIGN PATENT DOCUMENTS

| JP | 11-353263 | 12/1999 |
| JP | 2000-172665 | 6/2000 |
| JP | 2000-293423 | 10/2000 |
| JP | 2001-051762 | 2/2001 |

\* cited by examiner

*Primary Examiner*—Zarni Maung
*Assistant Examiner*—Alan S Chou
(74) *Attorney, Agent, or Firm*—Staas & Halsey, LLP

(57) ABSTRACT

The present invention provides a site evaluation system for evaluating a site which consists of one or more pages and a site evaluation program storage medium that stores thereon a site evaluation program for causing a computer system to operate as such a site evaluation system, in which site evaluation that minimizes errors and inconsistency and requires a lower evaluation cost can be performed. The system acquires a temporal change in the numbers of accesses to each of pages constituting a site, identifies a page for which a temporal change in the number of accesses exceeds a predetermined criterion, further acquires a temporal change in a word in the identified page, compares the temporal change in the number of accesses to the identified page with the temporal change of the word, and evaluates the comparison result based on a predetermined criterion.

3 Claims, 21 Drawing Sheets

| DATE | URI | THE NUMBER OF ACCESSES |
|---|---|---|
| 2002/01/18 | sales/def.html | 650 |
| 2002/01/18 | sales/list.html | 595 |
| 2002/01/19 | sales/def.html | 612 |

611      612      613

620

| TARGET | BEFORE A VARIATION | AFTER A VARIATION | VARIATION RATE | |
|---|---|---|---|---|
| ENTIRE SITE | 7240000 | 9830000 | 35.7 | —624a |
| WEB PAGE | 69400 | 126800 | 82.7 | —624b |

| DIFFERENCE BETWEEN VARIATION RATES | OUTPUT MESSAGE | |
|---|---|---|
| 0~9 | THE POSSIBILITY OF VARIATION IN RELATION TO THE SITE:5 | |
| 10~19 | THE POSSIBILITY OF VARIATION IN RELATION TO THE SITE:4 | |
| 20~29 | THE POSSIBILITY OF VARIATION IN RELATION TO THE SITE:3 | |
| 30~39 | THE POSSIBILITY OF VARIATION IN RELATION TO THE SITE:2 | |
| 40~ | THE POSSIBILITY OF VARIATION IN RELATION TO THE SITE:1 | —632a |

| KEYWORD | BEFORE A VARIATION | AFTER A VARIATION | VARIATION RATE |
|---|---|---|---|
| SUPPORT | 11 | 7 | -36.3 |
| PRODUCT INFORMATION | 3 | 2 | -33.3 |
| DOWNLOAD | 2 | 2 | 0.0 |
| INTERNET | 1 | 4 | 300.0 |
| SHOPPING | 0 | 5 | — |

| LINKED PAGE | BEFORE A VARIATION | AFTER A VARIATION | VARIATION RATE |
|---|---|---|---|
| sale/book.html | 350 | — | — |
| sale/box.html | 1240 | 834 | -32.7 |
| sale/cash.html | 72 | 134 | 86.0 |

SITE EVALUATION SYSTEM AND SITE EVALUATION PROGRAM STORAGE MEDIUM

This application claims benefit under 35 U.S.C. § 120 as a divisional of application Ser. No. 10/338,667, filed Jan. 9, 2003 and entitled "SITE EVALUATION SYSTEM AND SITE EVALUATION PROGRAM STORAGE MEDIUM," now U.S. Pat. No. 7,222,171 which is hereby incorporated by reference in its entirety into this application.

BACKGROUND OF THE INVENTION

1. Field of the Invention

The present invention relates to a site evaluation system for evaluating a site consisting of one or more pages, and to a site evaluation program storage medium that stores thereon a site evaluation program for causing a computer system to operate as such a site evaluation system.

2. Description of the Related Art

A conventional Web server on the Internet stores information such as images or text in the form of pages that are written in languages such as HTML (HyperText Markup Language) and XML (eXtensible Markup Language), and transmits the information to an access requestor in response to an external access request. Such a Web server also generates access logs which record the conditions of accesses to the Web server such as the IP address of an access requester, the domain name of an access requester, date and time of an access, or an accessed file name, for example.

The access logs generated by such a Web server are compiled by what is called access log analysis software. And the site operator of a Web site evaluates the Web site by analyzing factors in a variation in the number of accesses to the Web site based on results of the compiled access logs, and considers measures for increasing the number of accesses to the site for example.

However, analysis based on results of compiled access logs and evaluation of Web sites based on such analysis are made by human. As a result, evaluation result of Web sites thus derived can be affected by the experience and skill of operators to carry out analysis and evaluation and might cause errors or inconsistency in the results.

Also, an enormous amount of access logs may be generated for some Web sites, in which case the amount of result of compiling the logs will be enormous as well. It is inefficient for human to analyze such an amount of result and evaluate a Web site, and the problem of high labor cost is also encountered.

SUMMARY OF THE INVENTION

In view of these circumstances, the present invention has an object of providing a site evaluation system which enables evaluation with less errors and inconsistency and lower evaluation cost, and a site evaluation program storage medium which stores a site evaluation program for causing a computer system to operate as such a site evaluation system.

A first site evaluation system among the site evaluation systems of the present invention for attaining the object includes:

a page access count acquiring section acquiring a temporal change in the number of accesses for requesting pages, for each of pages that constitute a site for which a page requested by an access over a communication network is transmitted to an access source;

a site access count acquiring section acquiring for the site a temporal change in the total number of accesses for requesting the pages that constitute the site;

a page identification section identifying a page for which a temporal change in the number of accesses acquired by the page access count acquiring section exceeds a predetermined criterion;

a first evaluation section comparing the temporal change in the number of accesses to the page identified by the page identification section with the temporal change in the total number of accesses acquired by the site access count acquiring section, and evaluating the comparison result based on a predetermined evaluation criterion; and a first result providing section providing the result of evaluation by the first evaluation section for viewing.

A "page" herein refers to one that is written in such a language as HTML (HyperText Markup Language) or XML (extensible Markup Language).

To "acquire" means to compute or to get results of computing.

And "providing for viewing" means informing the result by electronic mail utilizing a communications network such as the Internet, informing the result by facsimile utilizing a communications network such as a telephone line or the like, or storing the result on a storage medium such as a hard disk or the like and permitting a browser to access it.

A first site evaluation system of the site evaluation system according to the present invention acquires temporal changes in the number of accesses to each of pages constituting a site and temporal changes in the number of accesses to all of the pages constituting the site, identifies a page for which temporal changes in the number of accesses exceed a predetermined criterion, compares the temporal changes in the number of accesses to the identified page with the temporal changes in the number of accesses to the entire site, and evaluates the comparison result based on a predetermined criterion. Hence, it can be automatically acquired by the site evaluation system how the variation in the number of accesses to an entire site affected the variation in the number of accesses to a page identified as an analysis target. That is, the possibility that the number of accesses to a page identified as an analysis target varied in relation to the number of accesses to an entire site is automatically evaluated by the site evaluation system. The first site evaluation system as such realizes site evaluation which can minimize errors and inconsistency and requires lower labor cost than conventional site evaluation by human.

A second site evaluation system of the site evaluation system of the present invention for attaining the object includes:

a page access count acquiring section acquiring a temporal change in the number of accesses for requesting pages, for each of pages that constitute a site for which a page requested by an access over a communication network is transmitted to an access source;

a page identification section identifying a page for which a temporal change in the number of accesses acquired by the page access count acquiring section exceeds a predetermined criterion;

a word acquiring section acquiring a temporal change in a word that is contained in the description of the page identified by the page identification section among the pages constituting the site as the description of the page is updated;

a second evaluation section comparing the temporal change in the number of accesses to the page identified by the page identification section with the temporal change in the word acquired by the word acquiring section, and evaluating the comparison result based on a predetermined evaluation criterion; and a second result providing section providing the result of evaluation by the second evaluation section for viewing.

A second site evaluation system of the site evaluation system of the present invention acquires temporal changes in the number of accesses to each of pages constituting a site, identifies a page for which a temporal change in the number of accesses have exceeded a predetermined criterion, further acquires temporal changes in words contained in the identified page, compares the temporal changes in the number of accesses to the identified page with the temporal changes in words in the page, and evaluates the comparison result based on a predetermined criterion. Hence, how modifications of description of a page identified as an analysis target affected the variation in the number of accesses is automatically evaluated by the site evaluation system. From this result, one can know whether or not increasing/decreasing information relevant to each word contained in the description of pages identified as analysis targets is effective in increasing the number of accesses to the pages. The second site evaluation system as such realizes site evaluation which can minimize errors and inconsistency and requires lower labor cost than conventional site evaluation by human as with the first site evaluation system above.

In the second site evaluation system mentioned above, the word acquiring section preferably acquires, as temporal changes in words, temporal changes in frequencies with which pre-registered predetermined words are used in pages identified by the page identification section from among pages constituting the site.

By comparing the temporal changes in frequencies of uses with the temporal changes in the number of accesses thus acquired and evaluating the result of comparison, it can be evaluated whether or not increasing/decreasing pre-registered predetermined words is effective in increasing the number of accesses to the pages in which the words are used.

A third site evaluation system among the site evaluation systems of the present invention for attaining the object includes:

a page access count acquiring section acquiring a temporal change in the number of accesses for requesting pages, for each of pages that constitute a site for which a page requested by an access over a communication network is transmitted to an access source;

a page identification section identifying a page for which a temporal change in the number of accesses acquired by the page access count acquiring section exceeds a predetermined criterion;

a third evaluation section comparing the temporal change in the number of accesses to the page identified by the page identification section with a temporal change in the number of accesses to a page that is linked to the page, and evaluating the comparison result based on a predetermined evaluation criterion; and a third result providing section providing the result of evaluation by the third evaluation section for viewing.

A third site evaluation system of the site evaluation system of the present invention acquires temporal changes in the number of accesses to each of pages constituting a site, identifies a page for which temporal changes in the number of accesses exceed a predetermined criterion, compares the temporal changes in the number of accesses to the identified page with temporal changes in the number of accesses to pages that are linked to the identified page, and evaluates the comparison result based on a predetermined criterion. Hence, it is automatically evaluated by the site evaluation system if the variation in the number of accesses to each of the linked page affected the variation in the number of accesses to a page identified as an analysis target. That is, it is automatically evaluated by the site evaluation system whether or not linked pages contribute to increasing the number of accesses to the pages identified as analysis targets. The third site evaluation system as such realizes site evaluation which can minimize errors and inconsistency and requires lower labor cost than conventional site evaluation by human as with the first and second site evaluation systems above.

The second or third site evaluation system also preferably includes:

a site access count acquiring section acquiring for the site a temporal change in the total number of accesses for requesting pages that constitute the site;

a first evaluation section comparing the temporal change in the number of accesses to the page identified by the page identification section with the temporal change in the total number of accesses acquired by the site access count acquiring section, and evaluating the comparison result based on a predetermined evaluation criterion; and a first result providing section providing the result of evaluation by the first evaluation section for viewing.

With the above described second site evaluation system that further includes a site access count acquiring section, the first evaluation section, and the first result providing section, it can be determined whether a variation in the number of accesses to a page is ascribed to either increased/decreased information relevant to each word contained in the description of the page or an entire site to which the page belong. Also, with the above described third site evaluation system that further comprises a site access count acquiring section, the first evaluation section, and the first result providing section, it can be determined whether a variation in the number of accesses to a page is ascribed to either pages that are linked to the page or an entire site to which the page belong.

A first site evaluation program storage medium of the site evaluation program storage media of the present invention for attaining the object stores a first site evaluation program which has:

a page access count acquiring section acquiring a temporal change in the number of accesses for requesting pages, for each of pages that constitute a site for which a page requested by an access over a communication network is transmitted to an access source;

a site access count acquiring section acquiring for the site a temporal change in the total number of accesses for requesting the pages that constitute the site;

a page identification section identifying a page for which a temporal change in the number of accesses acquired by the page access count acquiring section exceeds a predetermined criterion;

a first evaluation section comparing the temporal change in the number of accesses to the page identified by the page identification section with the temporal change in the total number of accesses acquired by the site access count acquiring section, and evaluating the comparison result based on a predetermined evaluation criterion; and a first result providing section providing the result of evaluation by the first evaluation section for viewing.

With the first site evaluation program storage medium of the site evaluation program storage media of the present invention, the first site evaluation system of the site evaluation system of the present invention can be easily realized in a computer system by installing the stored first site evaluation program onto a computer constituting the computer system and causing it to run.

A second site evaluation program storage medium of the site evaluation program storage media of the present invention for attaining the object stores a second site evaluation program which has:

a page access count acquiring section acquiring a temporal change in the number of accesses for requesting pages, for each of pages that constitute a site for which a page requested by an access over a communication network is transmitted to an access source;

a page identification section identifying a page for which a temporal change in the number of accesses acquired by the page access count acquiring section exceeds a predetermined criterion;

a word acquiring section acquiring a temporal change in a word that is contained in the description of the page identified by the page identification section among the pages constituting the site as the description of the page is updated;

a second evaluation section comparing the temporal change in the number of accesses to the page identified by the page identification section with the temporal change in the word acquired by the word acquiring section, and evaluating the comparison result based on a predetermined evaluation criterion; and a second result providing section providing the result of evaluation by the second evaluation section for viewing.

With the second site evaluation program storage medium of the site evaluation program storage media of the present invention, the second site evaluation system of the site evaluation system of the present invention can be easily realized in a computer system by installing the stored second site evaluation program onto a computer constituting the computer system and causing it to run. The second site evaluation program also includes all aspects that correspond to various aspects of the second site evaluation system.

A third site evaluation program storage medium of the site evaluation program storage media of the present invention for attaining the object stores a third site evaluation program which has:

a page access count acquiring section acquiring a temporal change in the number of accesses for requesting pages, for each of pages that constitute a site for which a page requested by an access over a communication network is transmitted to an access source;

a page identification section identifying a page for which a temporal change in the number of accesses acquired by the page access count acquiring section exceeds a predetermined criterion;

a third evaluation section comparing the temporal change in the number of accesses to the page identified by the page identification section with a temporal change in the number of accesses to a page that is linked to the page, and evaluating the comparison result based on a predetermined evaluation criterion; and a third result providing section providing the result of evaluation by the third evaluation section for viewing.

With the third site evaluation program storage medium of the site evaluation program storage media of the present invention, the third site evaluation system of the site evaluation system of the present invention can be easily realized in a computer system by installing the stored third site evaluation program onto a computer constituting the computer system and causing it to run. The third site evaluation program also includes all aspects that correspond to various aspects of the third site evaluation system.

Although individual components of the site evaluation system and the site evaluation program of the present invention have been given the same names, those components represent hardware and software with the site evaluation system and only software with the site evaluation program.

BRIEF DESCRIPTION OF THE DRAWINGS

FIG. 14 shows an access count obtaining table representing an example of table configurations for the numbers of accesses as just before/immediately after a variation in the number of accesses;

FIG. 15 shows an evaluation criterion table showing an exemplary evaluation criterion for site analysis;

DETAILED DESCRIPTION OF THE PREFERRED EMBODIMENTS

The embodiment of the present invention will be described in the following.

The present embodiment will be described with an example of a Web site analyzing system, which is an example of the site evaluation system according to the present invention, where access logs generated by a Web server on the Internet are compiled and a Web site is analyzed and evaluated based on the result of compiled access logs.

A Web site consists of multiple Web pages linked with each other in which information is described and its content is updated as required, and has the ability of transmitting a Web page to an access source when a Web page is requested by an access over a communications network such as the Internet.

Figure 1:
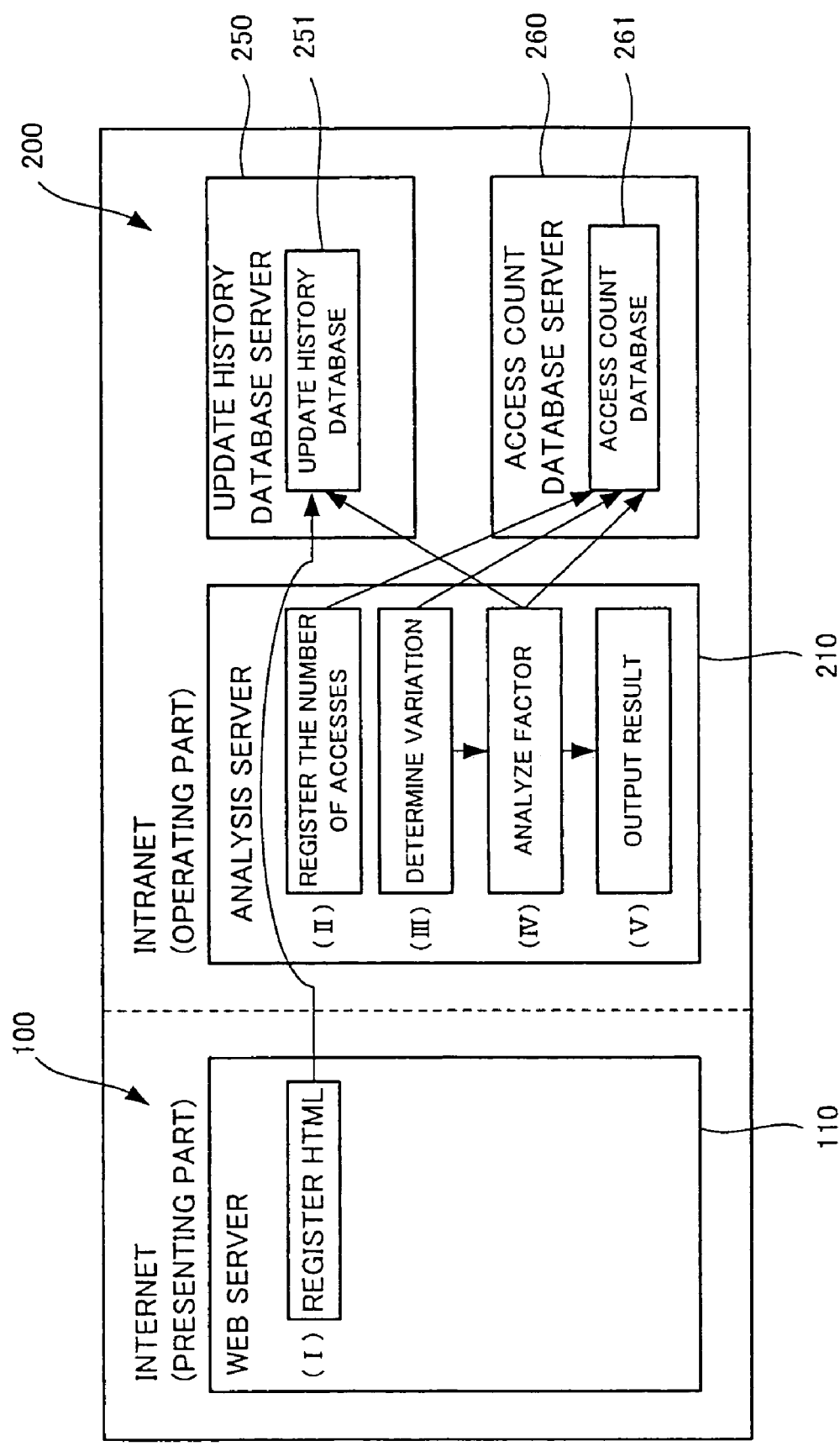
FIG. 1 shows an overall configuration of a computer system on a network that utilizes a Web site analyzing system as an embodiment of a site evaluation system of the present invention.
Figure 2:
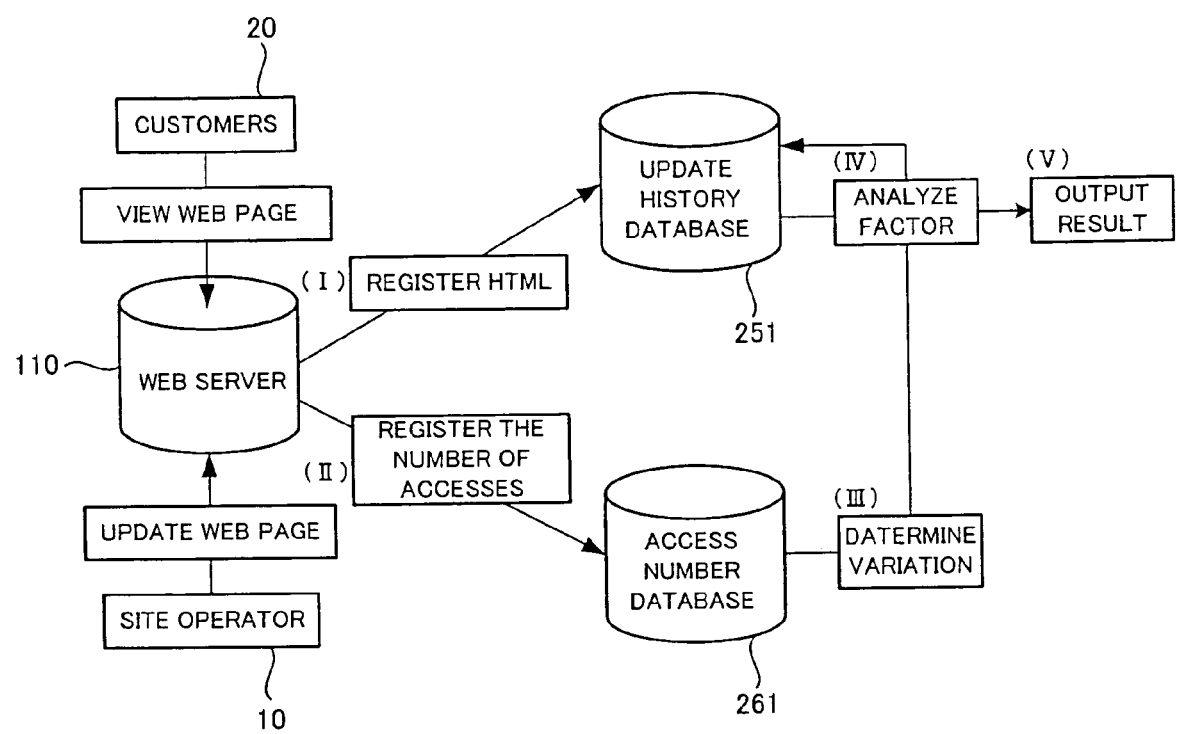
FIG. 2 shows a schematic diagram illustrating a procedure of analyzing a Web site in the computer system shown in FIG. 1.

FIG. 1 shows a general configuration of a computer system on a network that utilizes the Web site analyzing system as an embodiment of the site evaluation system according to the present invention. FIG. 2 is a schematic diagram showing a procedure of analyzing a Web site in the computer system in FIG. 1. In the following, the placement of the present invention will be first described with reference to FIGS. 1 and 2.

The overall configuration of the computer system in FIG. 1 shows a Web server 110, an analysis server 210, an update history database server 250, and an access count database server 260. Each of the Web server 110, analysis server 210, update history database server 250, and access count database server 260 comprises a relatively large work station or the like, and is connected via the Internet 100 or an intranet 200 with each other. The update history database server 250 has an update history database 251 for saving description to be mentioned below, and the access count database server 260 has an access count database 261 for saving the numbers of accesses to be mentioned below.

The Web server 110 is a server on the Internet 100 that stores information such as images or text in the form of pages which are written in languages such as HTML (HyperText Markup Language) and XML (extensible Markup Language), or generates pages by processing information such as images or text stored in the form of a database in accordance with scripts, and transmits the stored or generated pages to requesters in response to external access requests. The Web server 110 is also responsible for generating access logs which record the operation of the Web server 100 itself. The contents recorded as access logs include the IP address of a requester, the domain name of a requestor, the date and time of an access, or an accessed file name, etc. for example.

The analysis server 210 is a server on the intranet 200 connected to the Internet 100 that compiles access logs generated by the Web server 110 and analyzes and evaluates a Web site stored in the Web server 110 based on its update history or the numbers of accesses, which will be described later.

The update history database server 250 is a server on the intranet 200 connected to the analysis server 210 that, when the description of Web pages constituting a Web site stored in the Web server 110 is updated or added, obtains the updated or added description of the Web pages and saves the content of the obtained description in the update history database 251.

And the access count database server 260 is a server on the intranet 200 connected to the analysis server 210 that obtains the number of accesses to a Web site stored in the Web server 110, which can be derived by the analysis server 210 compiling access logs recorded by the Web server 110, and saves the number in the access count database 261.

Then, the summary of the procedure of analyzing a Web site in the computer system shown in FIG. 1 will be now described with reference to FIGS. 1 and 2.

First, when the description of a Web page constituting a Web site stored in the Web server 110 is updated or added by the site operator 10 of the Web site, the updated or added description of the Web page is registered with the update history database 251 (step 1). In a case where a Web page is generated based on information stored in the Web server 110 as a database, when the contents of stored information are updated or added by the site operator 10, it triggers the generation of a Web page by processing information including the updated or added information according to scripts, and the description of the Web page is registered with the update history database 251 (step 1).

Although a Web page in the present embodiment may be generated based on information stored as a database in the Web server 110 as described above, the following description will employ a Web page that is stored in the Web server 110 as the example of a Web page.

Then, when customers 20 view a Web page constituting a Web site stored in the Web server 110, access logs for the Web page are generated by the Web server 110, and the number of accesses to the Web page is derived by compiling the access logs in the analysis server 210, and the derived number is registered with the access count database 261 (step II).

The analysis server 210 then analyzes a variation in the number of accesses to the Web page from the number registered with the access count database 261 at step II (step II).

If any variation in the number of accesses is found at step III, the analysis server 210 retrieves the description of the Web page as it was just before the variation and the description of the Web page as immediately after the variation from the description of the Web page registered with the update history database 251, and ascertains the effect exerted on the variation in the number of accesses by the updated content of the Web page (step IV).

The analysis server 210 then generates a report on the Web site analysis result based on the analysis result obtained at step IV, and transmits the report by electronic mail to the site operator 10 of the Web site (step V).

The steps above will be specifically described below.

A feature of an embodiment of the present invention in the computer system shown in FIGS. 1 and 2 concerns the details of process carried out internally in the analysis server 210 shown in FIG. 1, thus the analysis server 210 will be first described.

Figure 3:
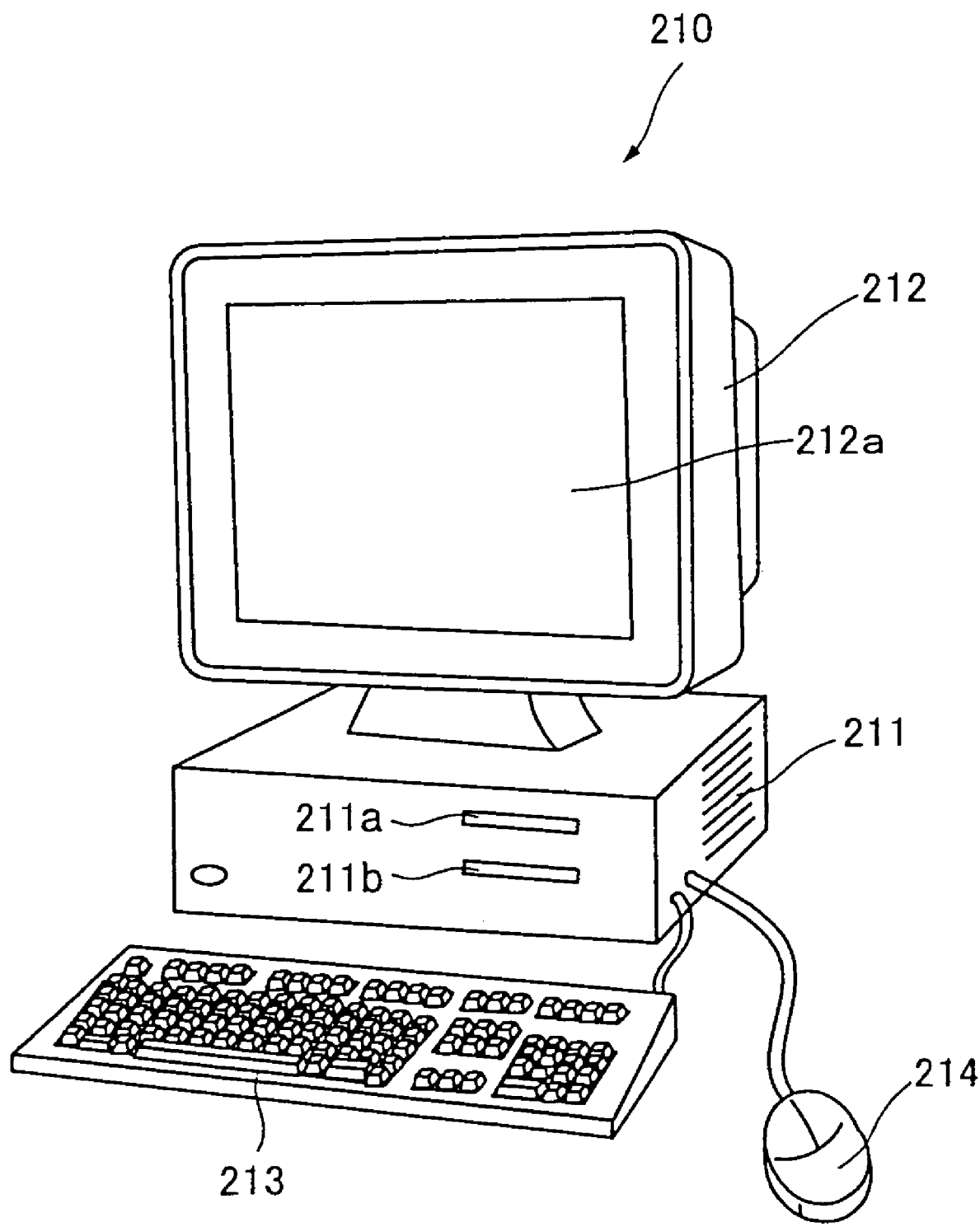
FIG. 3 shows an external oblique view of an analysis server that constitutes an embodiment of the site evaluation system of the present invention shown in blocks in FIG. 1.
Figure 4:
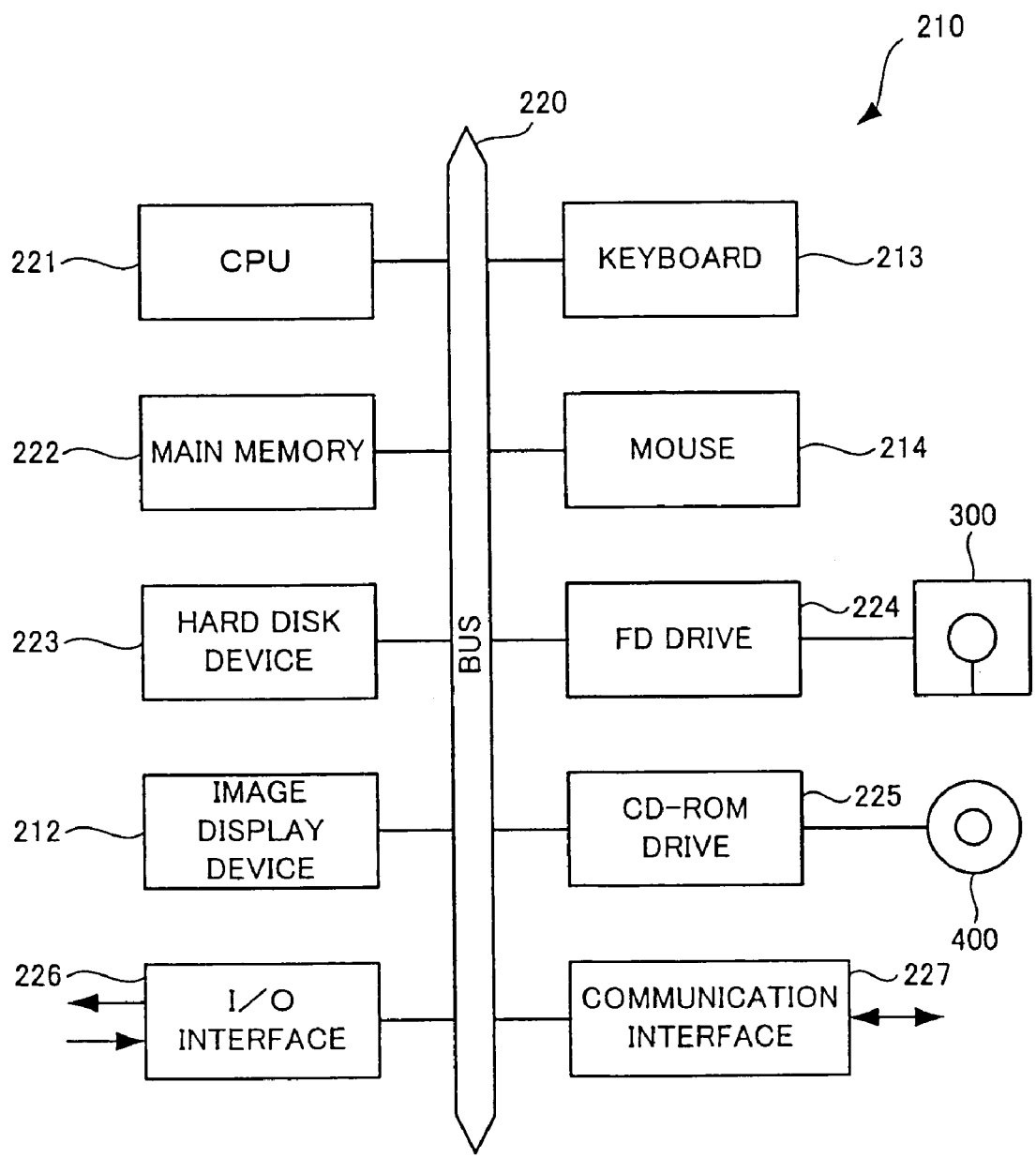
FIG. 4 shows a hardware configuration of the analysis server in FIG. 3.

FIG. 3 shows an external oblique perspective view of the analysis server 210 constituting an embodiment of the site evaluation system of the present invention shown in the block diagram of FIG. 1, and FIG. 4 shows the hardware configuration of the analysis server 210.

As shown in FIG. 3, the analysis server 210 externally comprises a main frame 211, an image display device 212 which displays images and text on a display screen 212a in response to directions from the main frame 211, a keyboard 213 for inputting various information according to key operations to the main frame 211, and a mouse 214 for specifying any location on the display screen 212a to input a direction according to an icon, for example, that is displayed at the location. The main frame 211 also externally has an FD inserting slot 211a for inserting a flexible disk (FD), and a CD-ROM mounting port 211b for mounting a CD-ROM.

As shown in FIG. 4, the main frame 211 of the analysis server 210 in FIG. 3 internally comprises a CPU 221 executing various programs, main memory 222 to which programs stored in a hard disk device 223 are read and spread out for the execution by the CPU 221, a hard disk device 223 for storing various programs and data, an FD drive 224 which accesses an FD 300 mounted thereon, a CD-ROM drive 225 which accesses a CD-ROM 400 mounted thereon, an I/O interface 226 which may be connected to a digital camera (not shown) and receive image data from it, or may be connected to a printer (not shown) and send data to it, and a communication interface 227 connected to a communication line (not shown) for controlling communication with other machines. These components, and the image display device 212, keyboard 213, and mouse 214 which are also shown in FIG. 3 are interconnected through a bus 220.

The CD-ROM 400 stores a site evaluation program for having the analysis server 210 operate as a site evaluation system. The CD-ROM 400 is mounted to the CD-ROM drive 225 and the site evaluation program stored on the CD-ROM 400 is uploaded to the analysis server 210 to be stored on the hard disk 223.

Although a CD-ROM has been given as the example of a storage medium storing the site evaluation program of the present invention, a hard disk with the site evaluation program uploaded thereon in the above way also represents an example of the storage medium. And if the site evaluation program is downloaded onto a different kind of storage medium such as an FD or the like, an FD with the downloaded site evaluation program stored thereon also represents an example of the storage medium. The storage medium for storing the site evaluation program is not limited to above examples, but may be a DVD, a compact disk, a small card-like or stick-like medium. In a case any of these storage media stores the site evaluation program, the computer executing the site evaluation program of the present invention will comprise a corresponding drive for accessing the medium.

Figure 5:
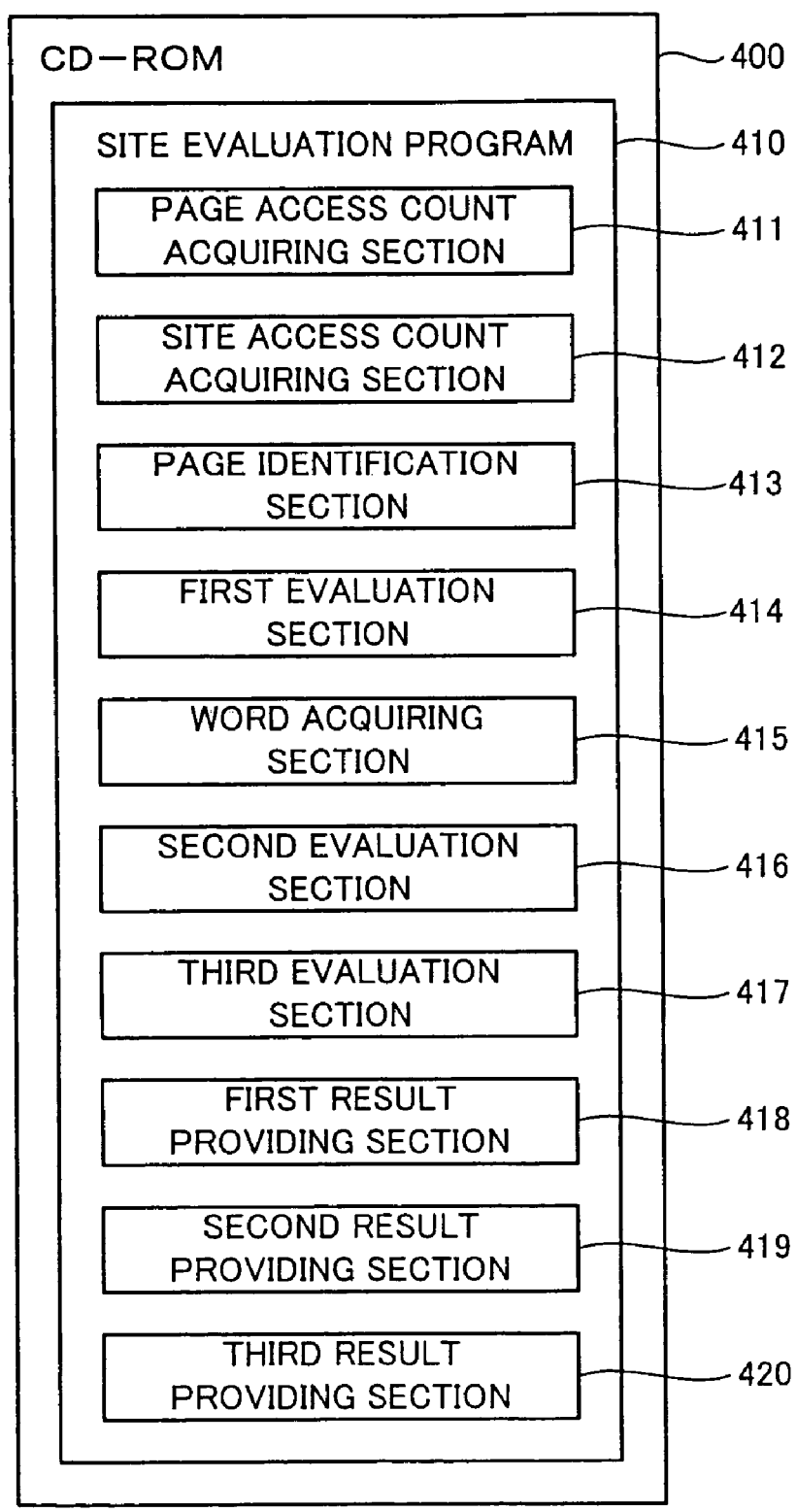
FIG. 5 shows an embodiment of a site evaluation program storage medium of the present invention.

FIG. 5 shows an embodiment of the site evaluation program storage medium of the present invention.

The site evaluation program 410 shown in FIG. 5 is stored on the CD-ROM 400 also shown in FIG. 4.

The site evaluation program 410 is a program that is executed in the analysis server 210 shown in FIGS. 1, 3, and 4, to cause the analysis server 210 to operate as the site evaluation system of the present invention that analyzes and evaluates Web sites. The site evaluation program 410 consists of a page access count acquiring section 411, a site access count acquiring section 412, a page identification section 413, a first evaluation section 414, a word acquiring section 415, a second evaluation section 416, a third evaluation section 417, a first result providing section 418, a second result providing section 419, and a third result providing section 420.

The operation of each element of the site evaluation program 410 will be described later.

Figure 6:
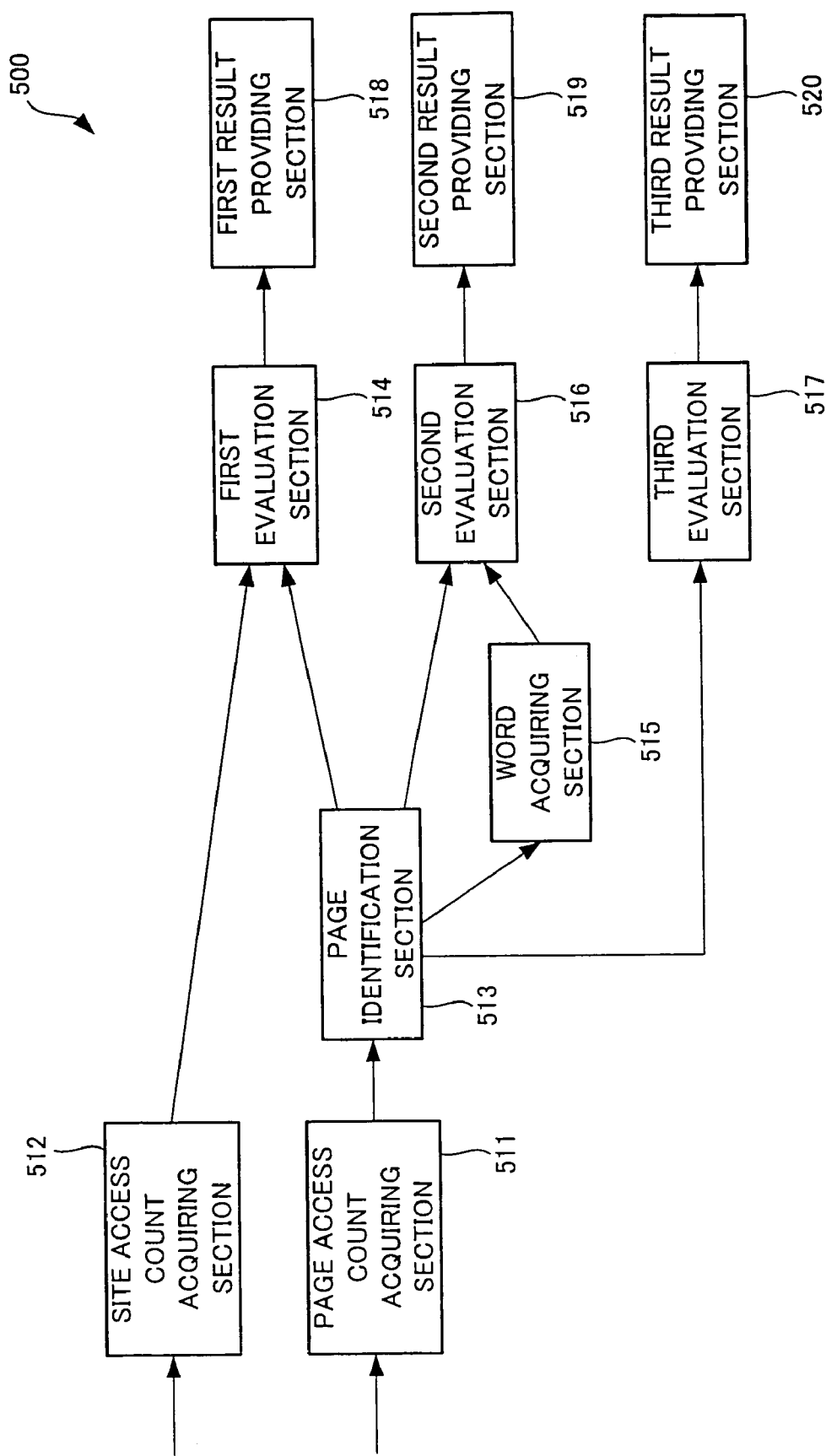
FIG. 6 shows a functional block diagram illustrating an embodiment of the site evaluation system of the present invention.

FIG. 6 shows a functional block diagram illustrating an embodiment of the site evaluation system of the present invention.

The site evaluation system 500 in FIG. 6 will be realized by loading the site evaluation program 410 shown in FIG. 5 to the analysis server 210 shown in FIGS. 1, 3, and 4, and executing the site evaluation program 410 in the analysis server 210.

The site evaluation system 500 in FIG. 6 is for analyzing and evaluating Web sites, comprising a page access count acquiring section 511, a site access count acquiring section 512, a page identification section 513, a first evaluation section 514, a word acquiring section 515, a second evaluation section 516, a third evaluation section 517, a first result providing section 518, a second result providing section 519, and a third result providing section 520.

Each of the page access count acquiring section 511, site access count acquiring section 512, page identification section 513, the first evaluation section 514, word acquiring section 515, the second evaluation section 516, the third evaluation section 517, the first result providing section 518, the second result providing section 519, and the third result providing section 520 provided in the site evaluation system 500 consists of the combination of each of the page access count acquiring section 411, site access count acquiring section 412, page identification section 413, the first evaluation section 414, word acquiring section 415, the second evaluation section 416, the third evaluation section 417, the first result providing section 418, the second result providing section 419, and the third result providing section 420, which are software parts constituting the site evaluation program 410 shown in FIG. 5; pieces of hardware of the analysis server 210 in FIGS. 1, 3, and 4 that are required to realize each function of the software parts; and an OS (Operating System) or application programs.

In the following, each element of the site evaluation system 500 in FIG. 6, and thus each element of the site evaluation program 410 shown in FIG. 5, will be described.

The following description addresses abstract operation of each element of the site evaluation system 500, and concrete operation of each element will be described later.

The page access count acquiring section 511 of the site evaluation system 500 shown in FIG. 6 is an element that corresponds to the page access count acquiring section 411 of the site evaluation program 410 in FIG. 5 in terms of application software, acquiring temporal changes in the number of accesses for requesting Web pages for each of Web pages constituting a Web site. The page access count acquiring section 511 represents an example of functions of the page access count acquiring section of the present invention, its function carried out by the combination of the I/O interface 226 or the communication interface 227 of the analysis server 210 shown in FIGS. 1, 3, and 4 and the CPU 221 or the like in terms of hardware.

The functions of individual elements of the site evaluation system 500 described below are also mainly carried out by the CPU 221 or the like of the analysis server 210 shown in FIGS. 1, 3, and 4 in terms of hardware, therefore description of these elements in relation to hardware will be omitted to avoid overlaps.

The site access count acquiring section 512 is an element that corresponds to the site access count acquiring section 412 of the site evaluation program 410 shown in FIG. 5 in terms of application software, acquiring temporal changes in the total numbers of accesses requesting Web pages constituting a Web site. The site access count acquiring section 512 represents an example of functions of the site access count acquiring section of the present invention.

The page identification section 513 is an element that corresponds to the page identification section 413 of the site evaluation program 410 shown in FIG. 5 in terms of application software, identifying a Web page for which temporal changes in the number of accesses acquired by the page access count acquiring section 511 exceed a predetermined criterion. The page identification section 513 represents an example of functions of the page identification section of the present invention.

The first evaluation section 514 is an element that corresponds to the first evaluation section 414 of the site evaluation program 410 shown in FIG. 5 in terms of application software, comparing temporal changes in the number of accesses to a Web page identified by the page identification section 513 with the temporal changes in the total number of accesses acquired by the site access count acquiring section 512, and evaluating a comparison result based on a predetermined evaluation criterion. The first evaluation section 514 represents an example of functions of the first evaluation section of the present invention.

The word acquiring section 515 is an element that corresponds to the word acquiring section 415 of the site evaluation program 410 shown in FIG. 5 in terms of application software, acquiring temporal changes in words contained in the description of a Web page that has been identified by the page identification section 513 among Web pages constituting a Web site as the description of the Web page is updated. Also, the word acquiring section 515 of the present embodiment is configured to acquire, as temporal changes in words, temporal changes in a frequency with which a pre-registered predetermined word (hereafter referred to as keywords) is used within a Web page which has been identified by the page identification section 513 from among pages constituting a Web site. The word acquiring section 515 represents an example of functions of the word acquiring section of the present invention.

The second evaluation section 516 is an element that corresponds to the second evaluation section 416 of the site evaluation program 410 shown in FIG. 5 in terms of application software, comparing temporal changes in the number of accesses to a Web page identified by the page identification section 513 with temporal changes in words acquired by the word acquiring section 515 and evaluating a comparison result based on a predetermined evaluation criterion. The second evaluation section 516 represents an example of functions of the second evaluation section of the present invention.

The third evaluation section 517 is an element that corresponds to the third evaluation section 417 of the site evaluation program 410 shown in FIG. 5 in terms of application software, comparing temporal changes in the number of accesses to a Web page identified by the page identification section 513 with temporal changes in the number of accesses to a Web page that is linked to the identified Web page and evaluating the comparison result based on a predetermined evaluation criterion. The third evaluation section 517 represents an example of functions of the third evaluation section of the present invention.

The first result providing section 518 is an element that corresponds to the first result providing section 418 of the site evaluation program 410 shown in FIG. 5 in terms of application software, informing results of evaluation by the first evaluation section 514 by electronic mail. The first result providing section 518 represents an example of functions of the first result providing section of the present invention.

The second result providing section 519 is an element that corresponds to the second result providing section 419 of the site evaluation program 410 shown in FIG. 5 in terms of application software, informing results of evaluation by the second evaluation section 516 by electronic mail. The second result providing section 519 represents an example of the functions of the second result providing section of the present invention.

The third result providing section 520 is an element that corresponds to the third result providing section 420 of the site evaluation program 410 shown in FIG. 5 in terms of application software, informing results of evaluation by the third evaluation section 517 by electronic mail. The third result providing section 520 represents an example of functions of the third result providing section of the present invention.

The embodiment of the present invention will be described more specifically in the following.

Figure 7:
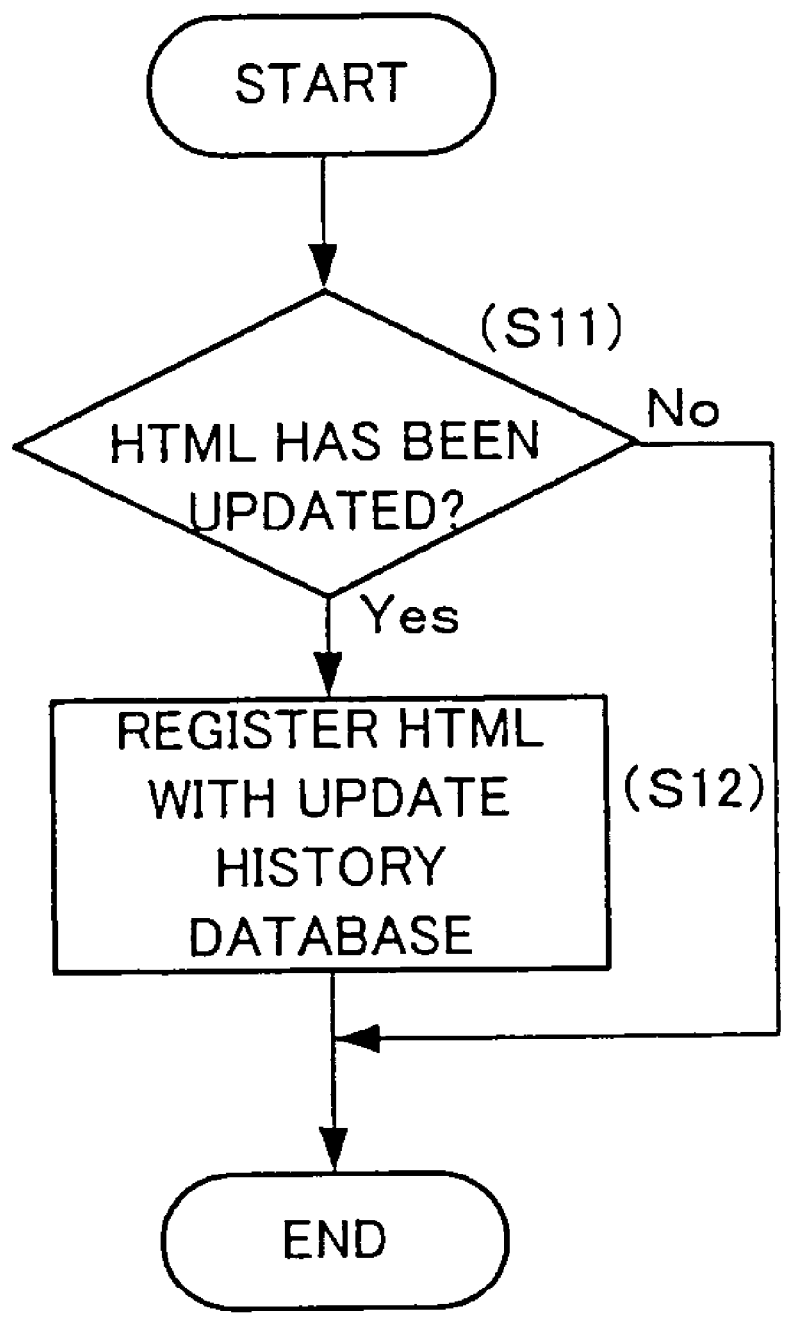
FIG. 7 shows a flow chart showing a flow of registering a Web page that constitutes a Web site with an update history database, which corresponds to a process at step I described with reference to FIGS. 1 and 2.

FIG. 7 is a flow chart showing a flow of registering Web pages constituting a Web site with the update history database 251, which corresponds to a process at step I described with reference to FIGS. 1 and 2.

First, when the site operator 10 of a Web site (see FIG. 2) uploads a Web site consisting of Web pages written in HTML to the Web server 110 (see FIGS. 1 and 2), the Web server 110 determines whether or not the Web pages are ones that are updated or added to Web pages already registered with the update history database 251 (see FIGS. 1 and 2) provided in the update history database server 250 (step S11).

If the Web pages are determined to be updated or added Web pages at step S11, then the description of the uploaded Web pages written in HTML is registered with the update history database 251 (see FIGS. 1 and 2)(step S12).

Figure 8:
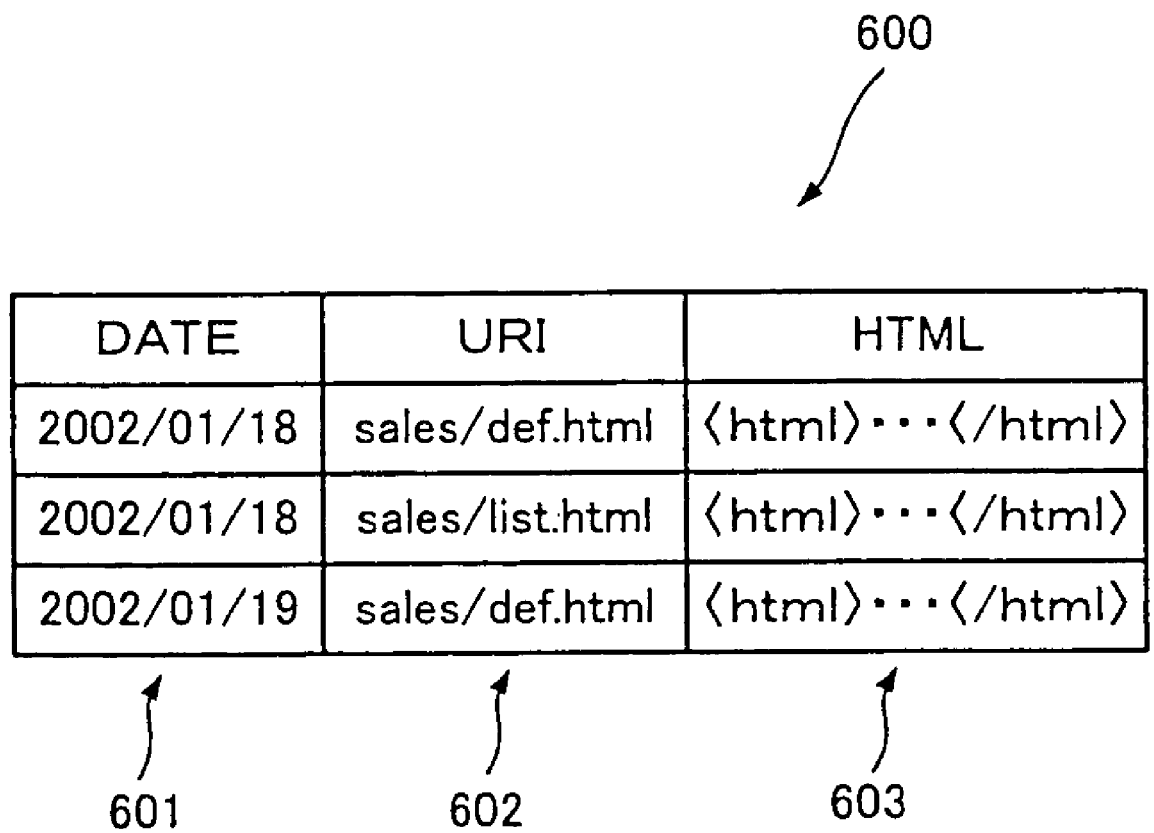
FIG. 8 shows an update history registration table representing an example of table configurations for an update history database.

FIG. 8 shows an update history registration table 600 showing an example of table configuration for an update history database 251.

The update history registration table 600 in FIG. 8 shows concrete examples of description registered at step S12 of FIG. 7.

As shown in FIG. 8, in the present embodiment, the date 601 on which the description of a Web page is registered, the URI (Uniform Resource Identifier) 602 for the file representing the registered Web page, and description 603 between the <html> tag and the </html> tag that is the description of the Web page written in HTML are associated with each other and registered with the update history database 251.

Figure 9:
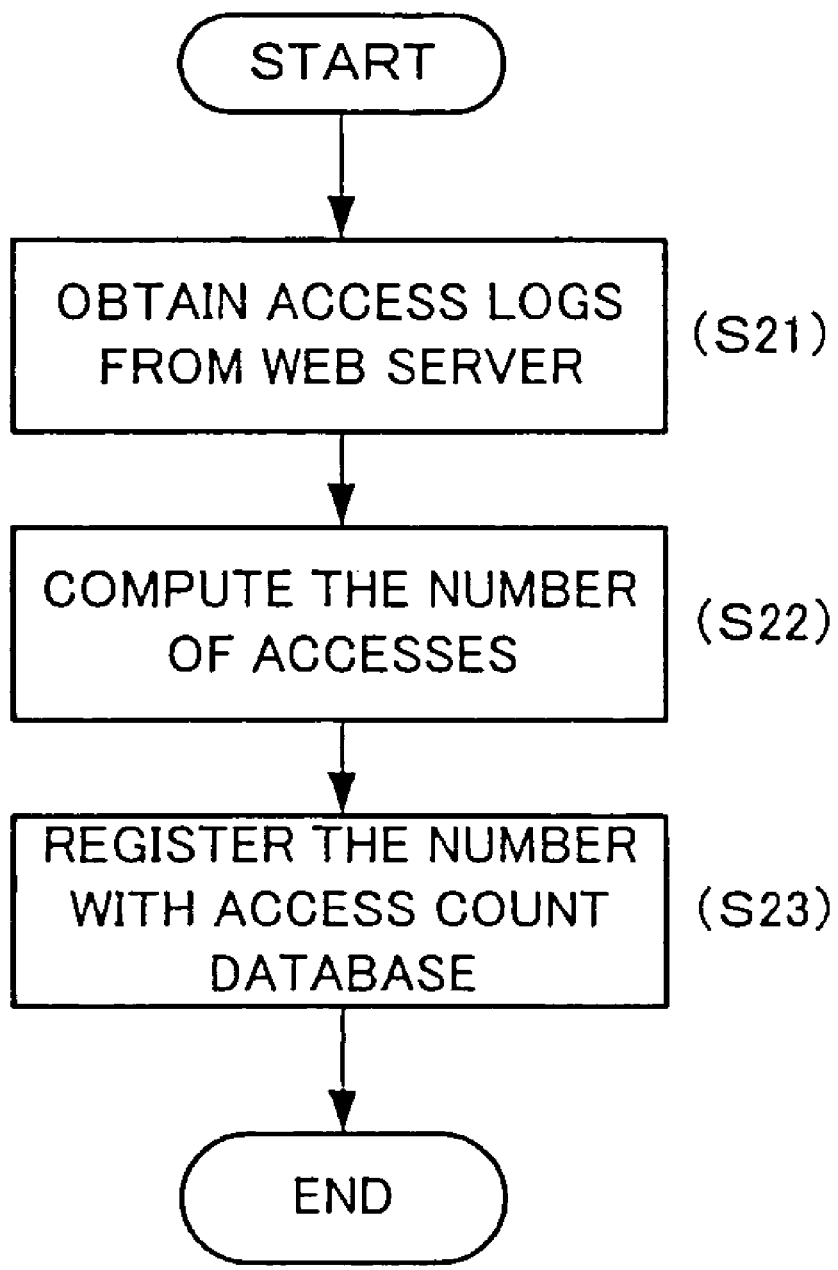
FIG. 9 shows a flow chart showing a flow of computing the number of accesses and registering the computed number with an access count database, which corresponds to a process at step II described with reference to FIGS. 1 and 2.

FIG. 9 is a flow chart showing a flow of computing the number of accesses and registering the computed number with the access count database 261, which corresponds to a process at step II described with reference to FIGS. 1 and 2.

First, access logs for Web pages that have been generated in the Web server 110 by Web page constituting a Web site stored in the Web server 110 being viewed by customers 20 are acquired from the Web server 110 by the analysis server 210 (see FIG. 1) once a day at 0:00 a.m. (when the date changes)(step S21).

The analysis server 210 then compiles the access logs acquired at step S21, and the page access count acquiring section 511 shown in FIG. 6 computes the number of accesses per day for each Web page constituting the Web site (step S22).

Then, the number of accesses per day for each Web page computed at step S22 is registered with the access count database 261 (see FIGS. 1 and 2) provided in the access count database server 260 (step S23).

The access count acquiring section 512 shown in FIG. 6 obtains the number of accesses for the entire Web site by summing the number of accesses for each Web page computed and registered in such a way for Web pages that constitute the Web site of interest.

Figure 10:
FIG. 10 shows an access count registration table representing an example of table configurations for an access count database.

FIG. 10 shows an access count registration table 610 representing an example of table configuration for an access count database 261.

The access count registration table 610 in FIG. 10 shows concrete examples of content registered at step S23 in FIG. 9.

As shown in FIG. 10, in the present embodiment, the date 611 on which the number of accesses is registered, the URI 612 for the file referring to the Web page, and the number of accesses 613 per day computed for each Web page are associated with each other and registered with the access count database 261.

Figure 11:
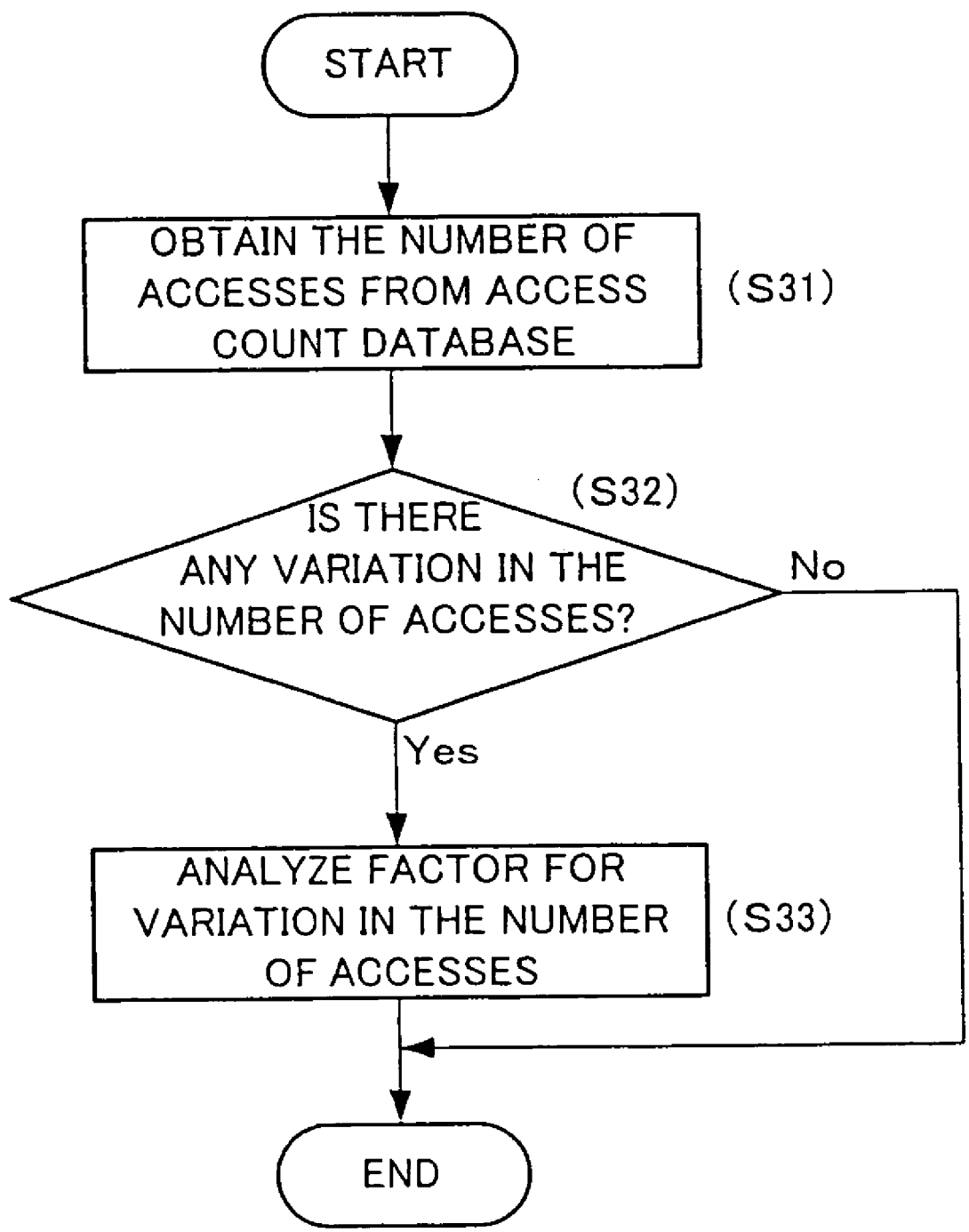
FIG. 11 shows a flow chart showing a flow of acquiring a variation in the number of accesses, which corresponds to a process at step III described with reference to FIGS. 1 and 2.

FIG. 11 is a flow chart showing a flow of acquiring a variation in the number of accesses, which corresponds to a process at step III described with reference to FIGS. 1 and 2.

First, the numbers of accesses registered with the access count database 261 (see FIGS. 1 and 2) are retrieved by the analysis server 210 (see FIG. 1)(step S31).

Then, a Web page for which the number of accesses retrieved at step S31 has varied (increased or decreased) in excess of a predetermined number of variation for a predetermined time period (e.g. one week, one month, or one year)(hereafter this Web page will be referred to as an analysis target Web page) is searched for at the page identification section 511 shown in FIG. 6 by the analysis server 210 (step S32).

If any analysis target Web page is found by the search at step S32, then a factor in the variation in the number of accesses to the analysis target Web page is analyzed by the analysis server 210 (step S33).

Figure 12:
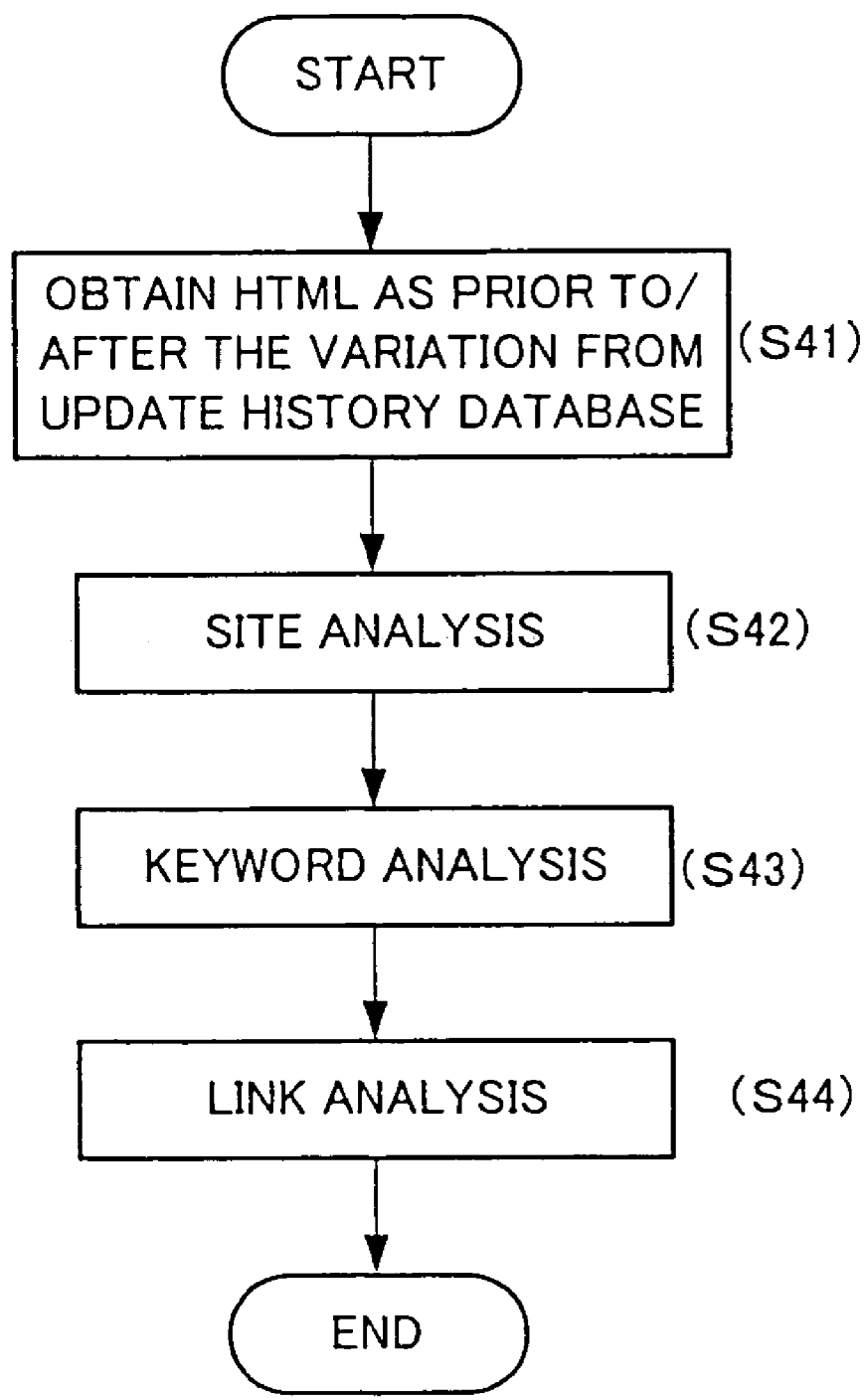
FIG. 12 shows a flow chart showing a flow of analyzing a factor for a variation in the number of accesses, which corresponds to a process at step IV described with reference to FIGS. 1 and 2.

FIG. 12 is a flow chart showing a flow of analyzing a factor in the variation in accesses, which corresponds to a process at step IV described with reference to FIGS. 1 and 2.

First, from description of the Web page registered in the update history database 251 (see FIGS. 1 and 2), the analysis server 210 (see FIG. 1) derives the description written in HTML of the analysis target Web page as just before the variation in the number of accesses and the description written in HTML of the analysis target Web page as immediately after the variation, which correspond to the analysis target Web page found at step S32 described with reference to FIG. 11 (step S41).

Then, among analyses of a factor for the variation in the number of accesses to the analysis target Web page, site analysis by the first evaluation section 514 shown in FIG. 6 is performed by the analysis server 210 (see FIG. 1)(step S42). The details of this site analysis will be described later.

Then, among analyses of a factor for the variation in the number of accesses to the analysis target Web page, keyword analysis by the second evaluation section 516 shown in FIG. 6 is performed by the analysis server 210 (see FIG. 1)(step S43). The details of this keyword analysis will also be described later.

Then, among analyses of a factor for the variation in the number of accesses to the analysis target Web page, link analysis by the third evaluation section 517 shown in FIG. 6 is performed by the analysis server 210 (see FIG. 1)(step S44). The details of the link analysis will be also described later.

The details of each of the site analysis, keyword analysis, and link analysis will be now described.

Figure 13:
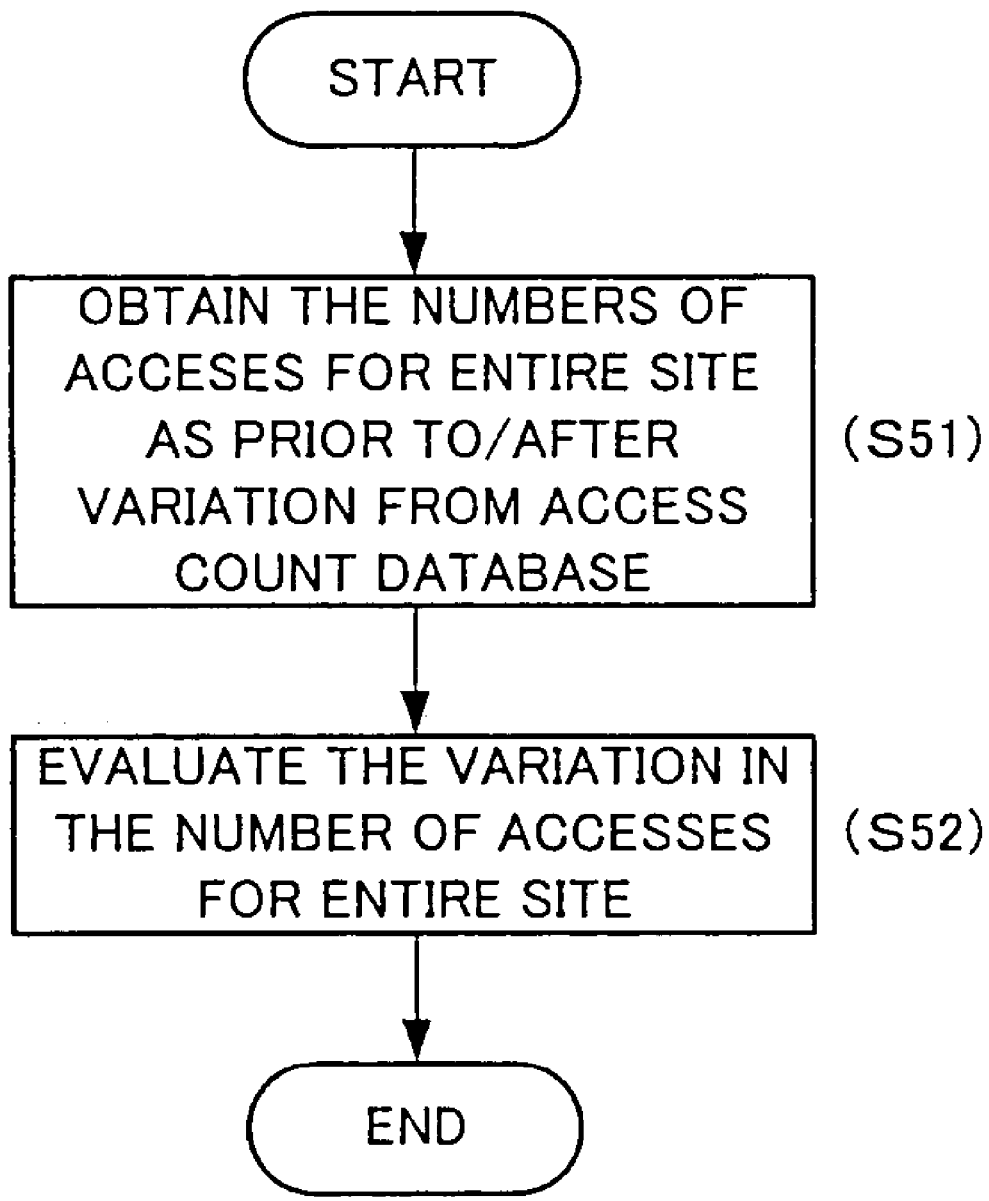
FIG. 13 shows a flow chart showing a flow of site analysis in FIG. 12 (step S42)

FIG. 13 is a flow chart showing a flow of site analysis (step S42) shown in FIG. 12.

First, for an analysis target Web page found at step S32 described with reference to FIG. 11 and the entire Web site to which the analysis target Web page belong respectively, the analysis server 210 (see FIG. 1) retrieves the number of accesses as just before the variation in the number of accesses and the number of accesses as immediately after the variation from the access count database 261 (see FIGS. 1 and 2)(step S51). Also, "the variation rate of the number of accesses" is computed based on the retrieved numbers.

FIG. 14 is an access count obtaining table 620 representing an example of table configurations for the numbers of accesses as just before/immediately after a variation in the number of accesses.

The access count obtaining table 620 of FIG. 14 shows specific examples of the numbers of accesses as just before/immediately after a variation in the number of accesses retrieved at step S51 of FIG. 13.

As shown in FIG. 14, in the present embodiment, targets 621 referring to an entire Web site and an analysis target Web page, the numbers of accesses 622 as just before a variation in the numbers of accesses to each of the targets 621, the numbers of accesses 623 as immediately after the variation in the numbers of accesses to each of the targets 621, and "variation rates of the number of accesses" 624 computed from the numbers of accesses 622 and the numbers of accesses 623 are associated with each other and retrieved from the access count database 261 (see FIGS. 1 and 2) by the analysis server 210 (see FIG. 1).

The "variation rate of the number of accesses" 624 in the access count obtaining table 620 in FIG. 14 can be determined with an equation (1) below.

"The variation rate of the number of accesses"=((the number of accesses after a variation−the number of accesses prior to the variation)÷the number of accesses prior to the variation)×100    (1)

When "the variation rates of the number of accesses" have been calculated in such a way, then at step S52 shown in FIG. 13, the difference value between "the variation rate of the number of accesses" for the entire Web site and "the variation rate of the number of accesses" for the analysis target Web page shown in FIG. 14 is computed, and, based on the computed difference value and a predetermined evaluation criterion, the effect is analyzed that was exerted on the variation in the number of accesses to the analysis target Web page by the variation in the number of accesses to the entire Web site.

FIG. 15 is an evaluation criterion table 630 showing an example of evaluation criteria for the site analysis.

The evaluation criterion table 630 in FIG. 15 represents a concrete example of an evaluation criterion table that consists of "the difference between variation rates" 631 that is a difference value between the "the variation rate of the number of accesses" 624a for the entire Web site and "the variation rate of the number of accesses" 624b for the analysis target Web page shown in FIG. 14, and output messages 632 that evaluate in five scales the possibility that the number of accesses to the analysis target Web page varied in relation to the number of accesses to the entire Web site based on "the difference between variation rates" 631.

Illustrating the concrete procedure of site analysis with the access count obtaining table 620 of FIG. 14, since "the variation rate of the number of accesses" 624a for the entire Web site that is obtained from the numbers of accesses as just before/immediately after a variation in the number of accesses to the entire Web site is "35.7%", and "the variation rate of the number of accesses" 624b that is obtained from the numbers of accesses as just before/immediately after the variation in the number of accesses to the analysis target Web page is "82.7%", "the difference between variation rates" will be calculated to be "47%". The "difference between variation rates" of "47%" falls within "40-" of "the difference between variation rates" 631 in the evaluation criterion table 630 in FIG. 15, thus an evaluation of "the possibility of variation in relation to the site: 1" (output message 632a) may be derived that means the possibility that the number of accesses to the analysis target Web page varied in relation to the number of accesses to the entire Web site is the lowest on five scales.

With such site analysis, if the number of accesses to an entire Web site varies in a similar way to that to an analysis target Web page, an evaluation can be automatically derived that the variation in the number of accesses to the entire Web site greatly affected the variation in the number of accesses to the analysis target Web page and the variation due to an update of the analysis target Web page had less effect, for example. As a result, site evaluation can be realized that can minimize errors or inconsistency and requires lower labor cost compared to conventional site evaluation by human.

Figure 16:
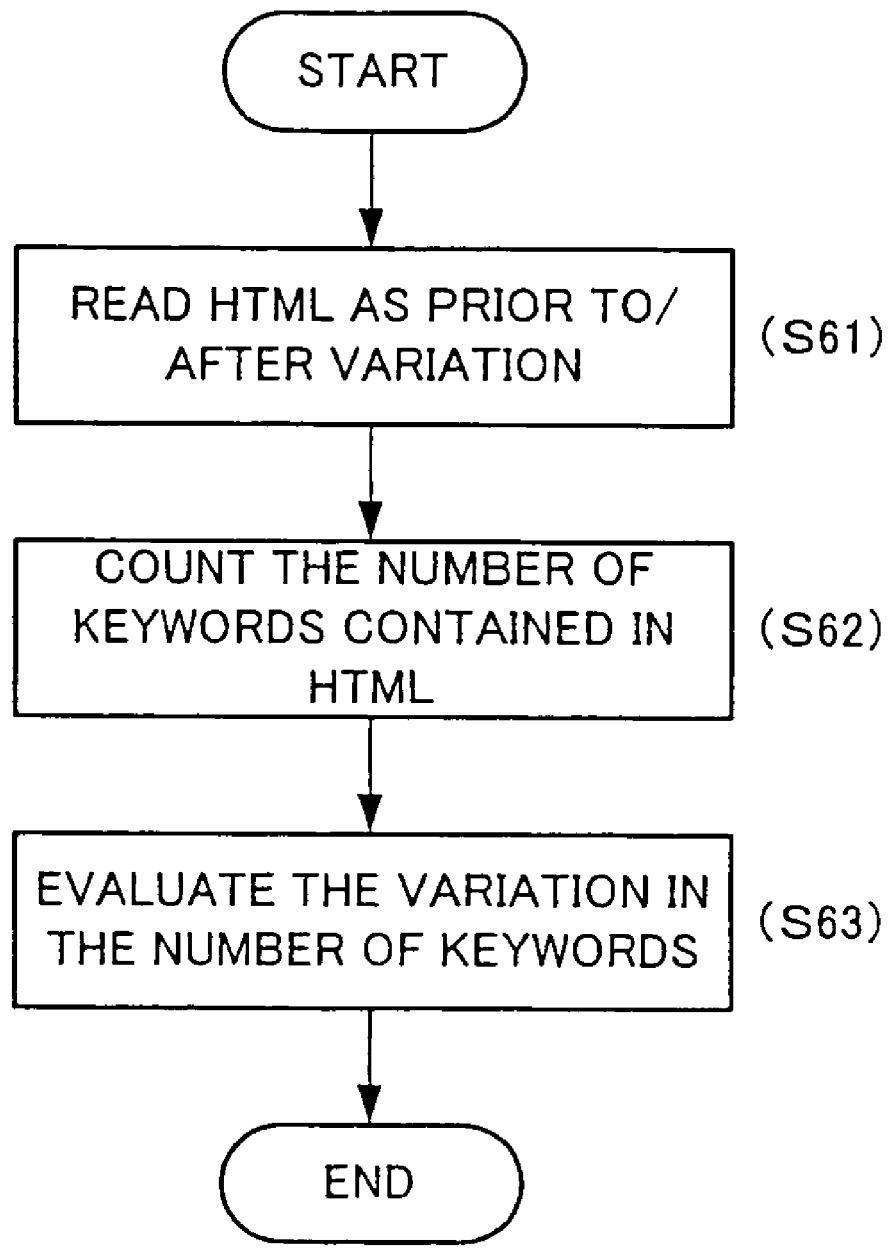
FIG. 16 shows a flow chart showing a flow of keyword analysis in FIG. 12 (step S43)

FIG. 16 is a flow chart showing a flow of keyword analysis (step S43) shown in FIG. 12.

First, description written in HTML of an analysis target Web page as just before/immediately after a variation in the number of accesses, which has been retrieved at step S41 described with reference to FIG. 12, is respectively read by the analysis server 210 (see FIG. 1)(step S61).

Figures 17, 18:
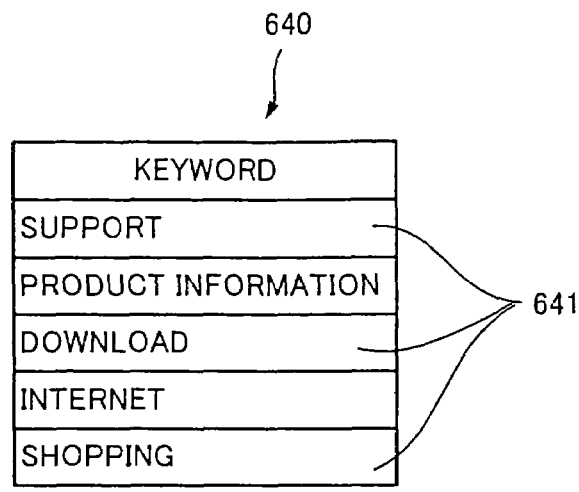
FIG. 17 shows a keyword table showing exemplary keywords that are registered in advance.
FIG. 18 shows a keyword count compiling table representing an example of a table configuration in which the numbers of keywords contained in an analysis target Web page just before/immediately after a variation in the number of accesses are compiled.

FIG. 17 is a keyword table 640 showing exemplary keywords that are registered in advance.

As shown in FIG. 17, five words, "support", "product information", "download", "Internet", and "shopping" are registered as keywords 641 in the keyword table 640 of the present embodiment.

Then, at step S62 in FIG. 16, the number of each pre-registered keyword that is contained in the description written in HTML of the analysis target Web page as just before/immediately after the variation in the number of accesses respectively (hereafter, this number will be referred to as the number of keywords), which have been read at step S61, are compiled by the word acquiring section 515 shown in FIG. 6. Also, "the variation rate of the number of keywords" is computed based on the obtained number of keywords.

FIG. 18 is a keyword count compiling table 650 representing an example of a table configuration in which the numbers of keywords contained in an analysis target Web page as just before/immediately after a variation in the number of access are compiled.

The keyword count compiling table 650 in FIG. 18 shows specific examples of the number of keywords contained in an analysis target Web page as just before/immediately after the variation in the number of accesses, which have been compiled at step S62 described with reference with FIG. 16.

As shown in FIG. 18, in the present embodiment, pre-registered keywords 651, the number of keywords 652 for each of the keywords 651 in the analysis target Web page prior to a variation in the number of accesses, the number of keywords 653 for each of the keywords 651 in the analysis target Web page immediately after the variation in the number of accesses, and "the variation rate of the number of keywords" 654 computed using the number of keywords 652 and the number of keywords 653 are compiled.

The "variation rate of the number of keywords" 654 in the keyword count compiling table 650 in FIG. 18 is obtained with an equation (2) below.

The "variation rate of the number of keywords"=
((the number of keywords after a variation−the number of keywords prior to the variation)÷the number of keywords prior to the variation)×100     (2)

When "the variation rate of the number of keywords" has been thus obtained, then, at step S63 shown in FIG. 16, a predetermined evaluation criterion is applied to "the variation rate of the number of accesses" for the analysis target Web page shown in FIG. 14 and "the variation rate of the number of keywords" for the analysis target Web page shown in FIG. 18 so that the effect exerted on the variation in the number of accesses by the updated content of the analysis target Web page can be analyzed.

Figure 19:
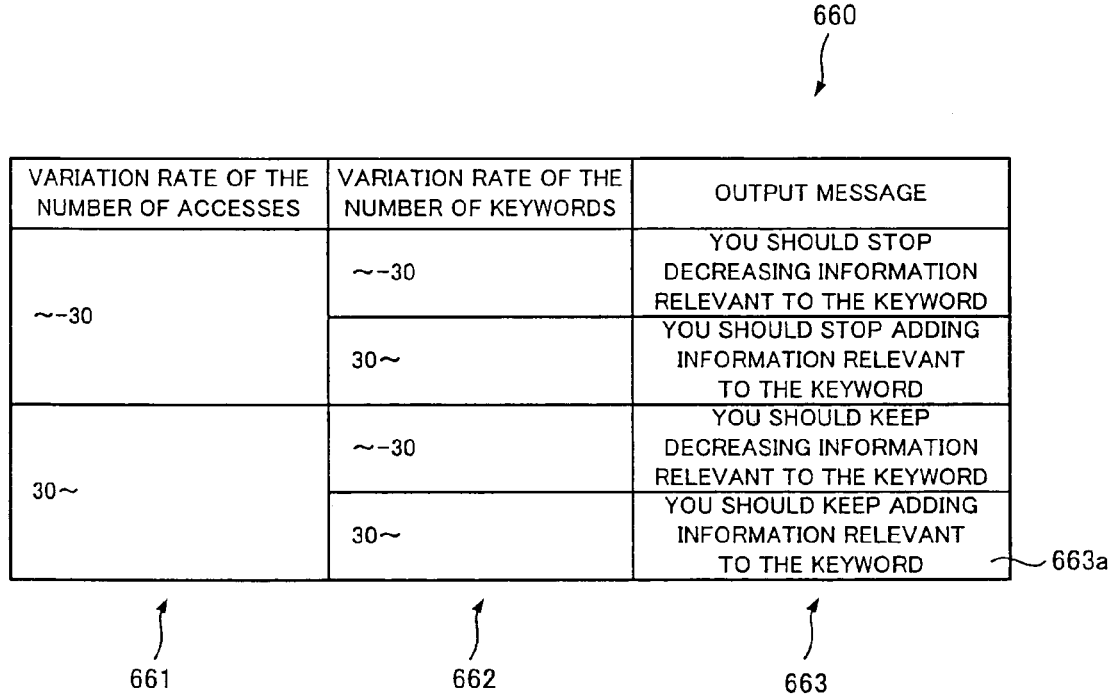
FIG. 19 shows an evaluation criterion table showing an exemplary evaluation criterion for keyword analysis.

FIG. 19 is an evaluation criterion table 660 showing an example of evaluation criterion for keyword analysis.

The evaluation criterion table 660 of FIG. 19 represents a concrete example of an evaluation criterion table which consists of output messages 663 that evaluate whether increasing/decreasing information relevant to each keyword is effective in increasing the number of accesses to an analysis target Web page, based on variation rate of the number of accesses 661 to which "the variation rate of the number of accesses" 624b for the analysis target Web page shown in FIG. 14 corresponds, and on the variation rate of the number of keywords 662 to which "the variation rate of the number of keywords" 654 shown in FIG. 18 corresponds.

Illustrating the keyword analysis, since the "Internet" in FIG. 18 has "the variation rate of the number of keywords" 654a of "300.0%", and "the variation rate of the number of accesses" 624b for the analysis target Web page shown in FIG. 14 is "82.7%", the variation rate of the number of accesses 661 of the evaluation criterion table 660 in FIG. 19 falls within "30-" and the variation rate of the number of keywords 662 falls within "30-", thus an evaluation that "You should keep adding information relevant to the keyword" (output message 663a) is obtained.

With such keyword analysis, if the number of accesses to an analysis target Web page varies in a similar way to the number of keywords in the analysis target Web page, an evaluation that modification of description of the analysis target Web page greatly affected the variation in the number of accesses to the same Web page, for example, can be automatically derived. As a result, as with the site analysis above, site evaluation can be realized that can minimize errors or inconsistency and requires lower labor cost than conventional site evaluation by human.

Figure 20:
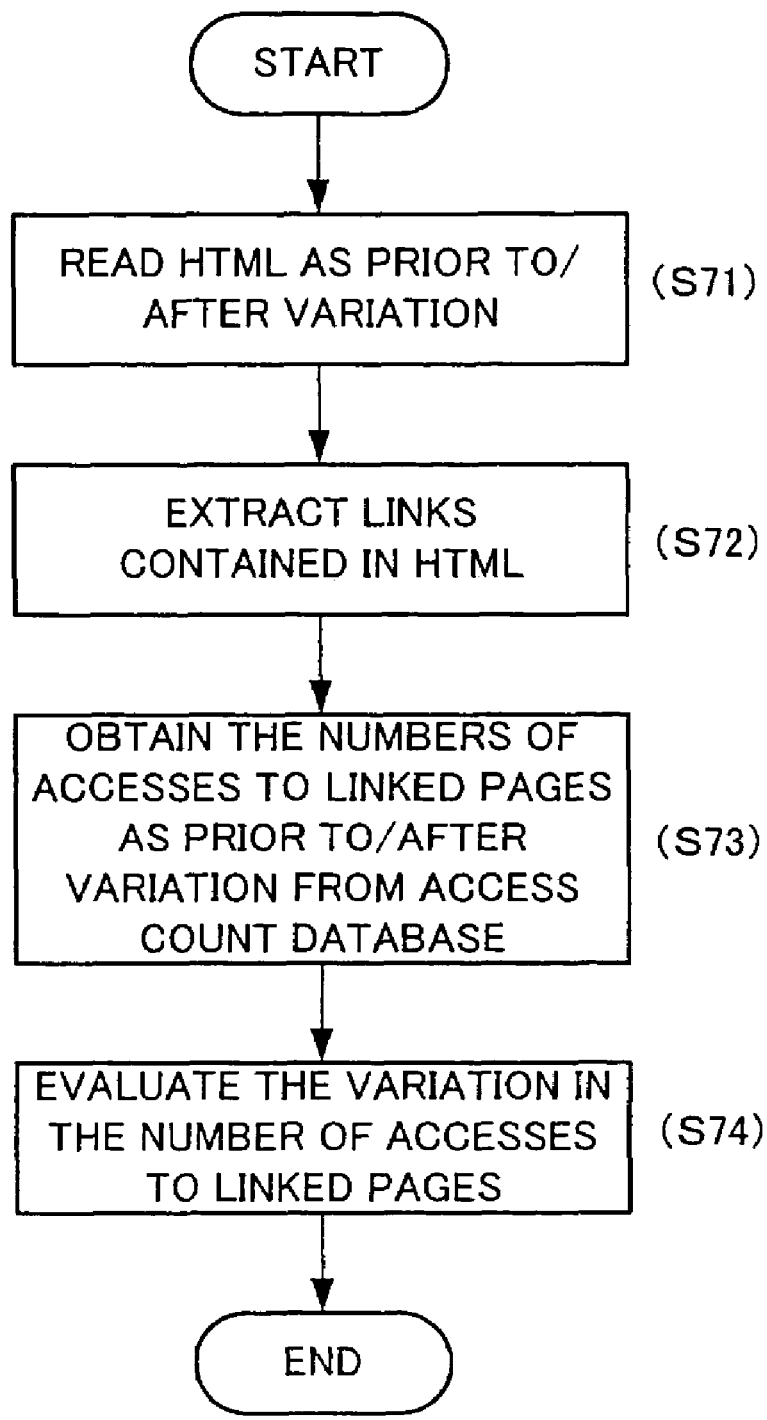
FIG. 20 shows a flow chart showing a flow of link analysis in FIG. 12 (step S44)

FIG. 20 is a flow chart showing a flow of link analysis shown in FIG. 12 (step S44).

First, the description written in HTML of the analysis target Web page as just before/immediately after the variation in the number of accesses respectively, which has been derived at step S41 described with reference to FIG. 12, is read by the analysis server 210 (see FIG. 1)(step S71).

Then, the URI of a Web page that is linked to the analysis target Web page, contained in the description written in HTML of the analysis target Web page as just before/immediately after the variation in the number of accesses that has been read at step S71, is extracted (step S72).

Figures 21, 22:
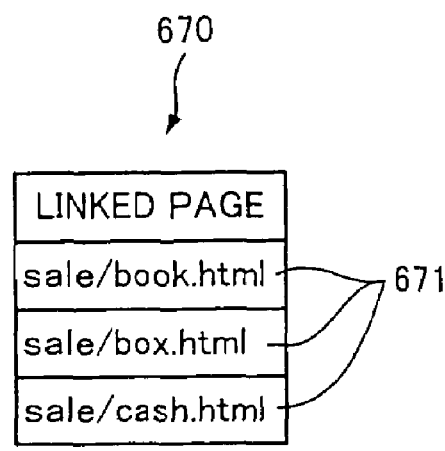
FIG. 21 shows a URI table showing exemplary URIs of Web pages linked to an analysis target Web page.
FIG. 22 shows an access count compiling table representing an example of table configuration which compiles the number of accesses to the Web pages that are linked to an analysis target Web page as just before/immediately after a variation in the number of accesses.

FIG. 21 shows a URI table 670 showing examples of URIs of Web pages that are linked to the analysis target Web page.

As shown in FIG. 21, in the URI table 670 of the present embodiment, three URIs 671, "sale/book.html", "sale/box.html", and "sale/cash.html" have been extracted at step S72 as the URIs 671 of the Web pages linked to the analysis target Web page.

Then, at step S73 shown in FIG. 20, the number of accesses just before the variation in the number of accesses and the number of accesses immediately after the variation for a Web page corresponding to the URI 671 extracted at step S72 are retrieved from the access count database 261 (see FIGS. 1 and 2). "The variation rates of the number of accesses" are also computed based on the retrieved numbers of accesses.

FIG. 22 is an access count compiling table 680 representing an example of a table configuration that compiles the numbers of accesses to the Web pages linked to the analysis target Web page as just before/immediately after the variation in the number of accesses.

The access count compiling table 680 in FIG. 22 shows concrete examples of the numbers of accesses as just before/immediately after the variation in the number of accesses, which have been retrieved at step S73 described with reference to FIG. 20.

As shown FIG. 22, in the present embodiment, URIs 681 of Web pages linked to an analysis target Web page, the numbers of accesses 682 as just before the variations in the number of accesses to each of the URIs 681, the numbers of accesses 683 as immediately after the variation in the number of accesses to each of the URIs 681, and "variation rates of the number of accesses" 624 computed using the numbers of accesses 682 and the numbers of accesses 683 are associated with each other and retrieved from the access count database 261 (see FIGS. 1 and 2) by the analysis server 210 (see FIG. 1).

"The variation rate of the number of accesses" 684 in the access count compiling table 680 in FIG. 22 can be obtained with an equation (3) below.

"The variation rate of the number of accesses"=((the number of accesses after a variation−the number of accesses prior to the variation)÷the number of accesses prior to the variation)×100 (3)

When "the variation rate of the number of accesses" has been thus obtained, then, at step S74 shown in FIG. 20, a predetermined evaluation criterion is applied to "the variation rate of the number of accesses" for the analysis target Web page shown in FIG. 14 and "the variation rate of the number of accesses" for a Web page linked to the analysis target Web page shown in FIG. 22 to analyze how the variation in the number of accesses to the linked page affected the variation in the number of accesses to the analysis target Web page.

Figure 23:
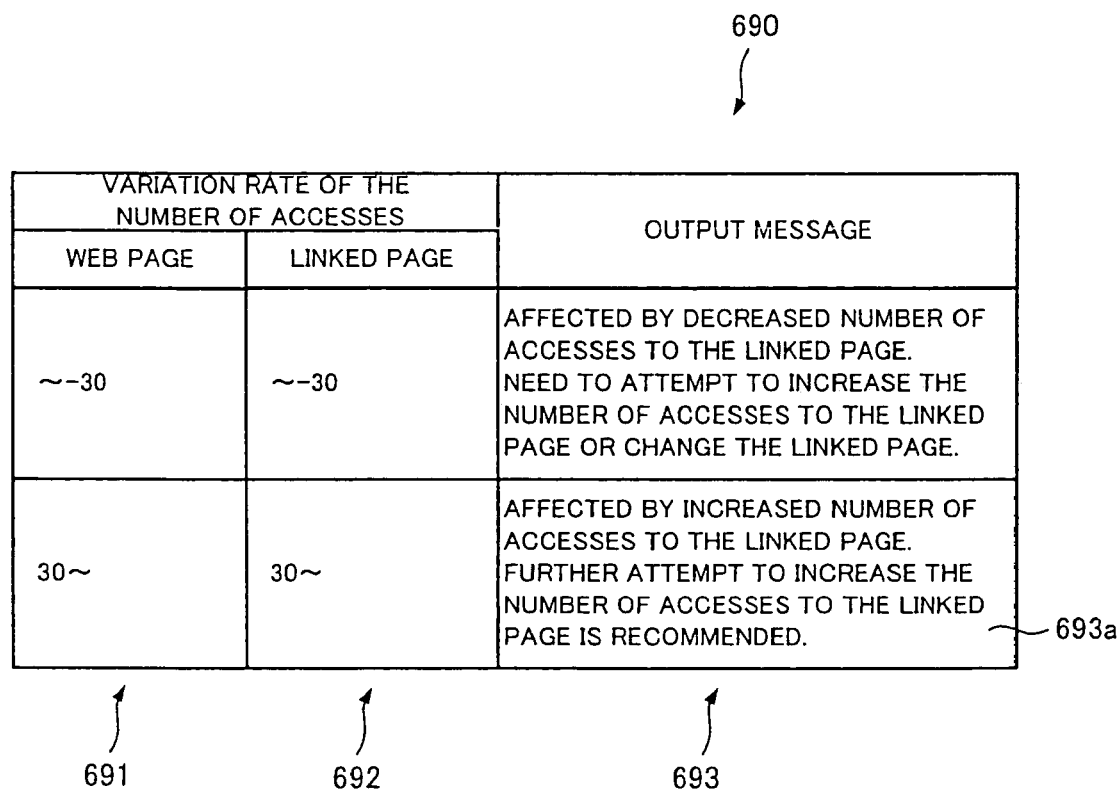
FIG. 23 shows an evaluation criterion table showing exemplary evaluation criterion for link analysis.

FIG. 23 is an evaluation criterion table 690 showing an example of the evaluation criterion for link analysis.

The evaluation criterion table 690 shown in FIG. 23 represents a concrete example of an evaluation criterion table that consists of output messages 693 that evaluate whether improving or changing the linked page is effective in increasing the number of accesses to the analysis target Web page from the variation in the number of accesses to each of linked Web pages, based on the variation rate of the number of accesses 691 to which "the variation rate of the number of accesses" 624b for the analysis target Web page shown in FIG. 14 corresponds, and on the variation rate of the number of accesses 692 to which "the variation rate of the number of accesses" 684 for a Web page linked to the analysis target Web page corresponds.

Illustrating the link analysis, for example, since "sale/cash.html" shown in FIG. 22 has "the variation rate of the number of accesses" 684a of "86.0%" and the "variation rate of the number of accesses" 624b for the analysis target Web page shown in FIG. 14 is "82.7%", the variation rate of the number of accesses 691 of the evaluation criterion table 690 in FIG. 23 falls within "30-" and the variation rate of the number of accesses 692 falls within "30-", thus an evaluation of "Affected by increased number of accesses to the linked page. Further attempt to increase the number of accesses to the linked page is recommended." (output message 693a) can be derived.

With such link analysis, if the number of accesses to an analysis target Web page varies in a similar way to that to a Web page linked to the analysis target Web page, for example, an evaluation may be automatically derived that the variation in the number of accesses to the Web page linked to the analysis target Web page has greatly affected the variation (increase) in the number of accesses to the analysis target Web page, for example. As a result, as with the site analysis and keyword analysis above, site evaluation that can minimize errors and inconsistency and requires lower labor cost than conventional site evaluation by human can be realized.

Figure 24:
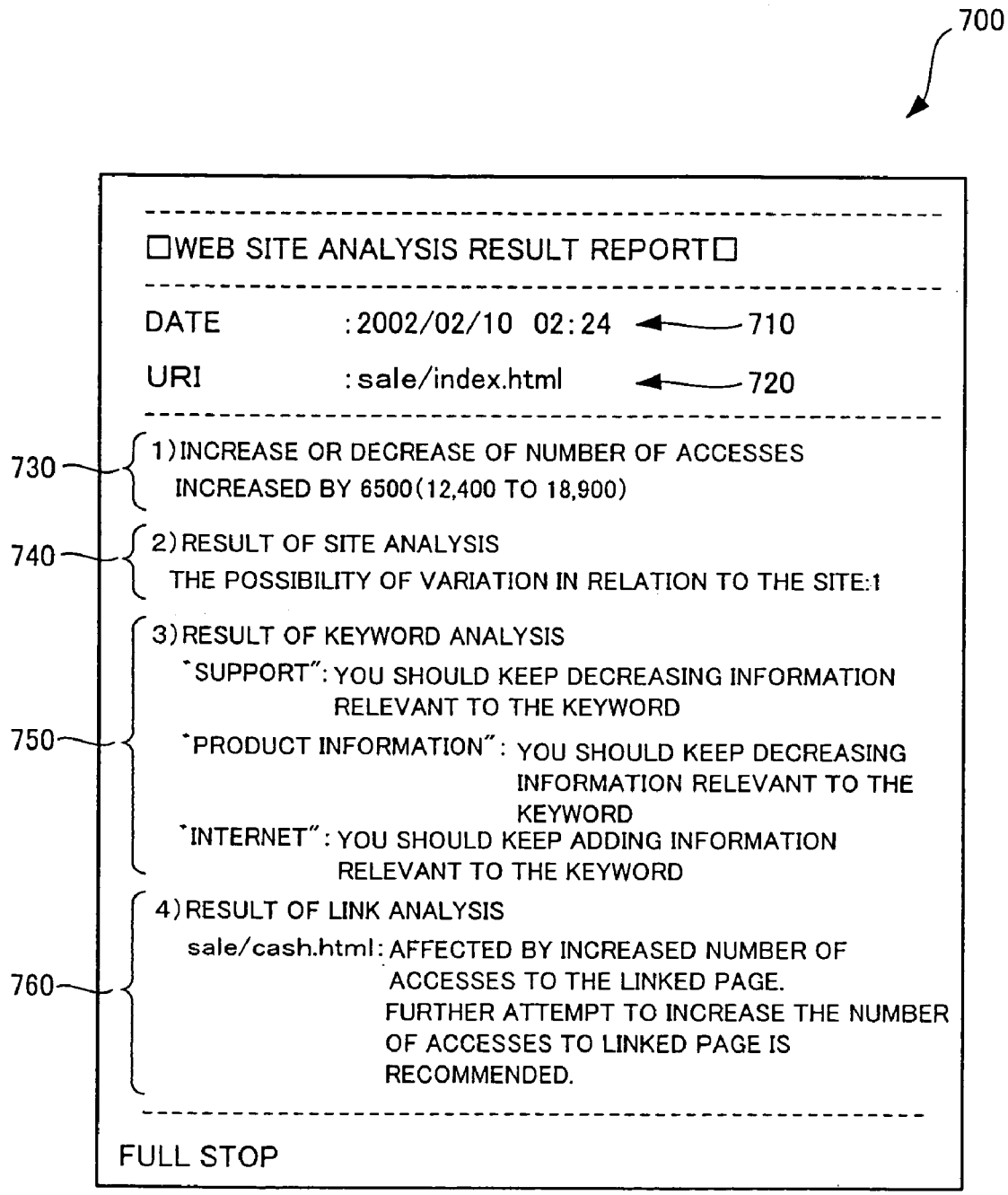
FIG. 24 shows an exemplary report on a Web site analysis result, which is transmitted at step V described with reference to FIGS. 1 and 2.

FIG. 24 shows an exemplary Web site analysis result report that is generated and transmitted at step V described with reference to FIGS. 1 and 2.

The Web site analysis result report 700 in FIG. 24 is generated at the first result providing section 518, the second result providing section 519, and the third result providing section 520 shown in FIG. 6 by the analysis server 210 (see FIG. 1) based on the results of analyses above. This Web site analysis result report 700 shows a date and time 710 when the analysis target Web page was analyzed, a URI 720 that refers to the analysis target Web page, increase or decrease of the number of accesses to the analysis target Web page 730, the result of site analysis 740 based on the site analysis described with FIGS. 13, 14, and 15, the result of keyword analysis 750 based on the keyword analysis described with FIGS. 16, 17, 18, and 19, and the result of link analysis 760 based on the link analysis described with FIGS. 20, 21, 22, and 23.

The site analysis result 740 in the Web site analysis result report 700 in FIG. 24 is presented by embedding the output message 632 in the evaluation criterion table 630 described with reference to FIG. 15 in the report.

The keyword analysis result 750 is presented by embedding the output message 663 in the evaluation criterion table 660 described with FIG. 19 in the report.

The link analysis result 760 is presented by embedding the output message 693 in evaluation criterion table 690 described with reference to FIG. 23 in the report.

Such a Web site analysis result report 700 is transmitted to the site operator 10 (see FIG. 2) of the Web site by electronic mail.

Although the above description of the present embodiment has given an example in which a computer is configured to operate as the site evaluation system of the present invention when the site evaluation program of the present invention is installed in the computer and run thereon, the site evaluation system of the present invention may be such that when the site evaluation program of the present invention is installed in multiple computers and run thereon, a computer system consisting of the computers operates as the site evaluation system of the present invention.

Although the description of the present embodiment has given an example where the result of evaluation is informed by electric mail as an example of means for "providing" the result of evaluation "for viewing" at each of the first, second, and third result providing sections of the present invention, the result of evaluation may be informed by utilizing facsimile over a communications network such as a telephone network, or may be stored on a storage medium such as a hard disk or the like and allowing a browser to access it, when the first, second, and third result providing sections "provide results for viewing".

And although the description of the present embodiment has given "the variation rate of the number of accesses" as an example of "temporal changes in the number of accesses" and "temporal changes in total number of accesses" of the present invention, "temporal changes in the number of accesses" or "temporal changes in total number of accesses" of the present invention may be "a difference value between the numbers of accesses", for example.

Although the description of the present embodiment has given "the variation rate of the number of keywords" as an example of "the temporal changes in words" of the present invention, "the temporal changes in words" of the present invention may be "the variation rate of words", "a difference value for words", or "a difference value between the numbers of keywords", for example.

Although the description of the present embodiment has given an example of evaluation which is based on a change rate of the number of pre-registered keywords contained in the description of an analysis target Web page as an example of the second evaluation section of the present invention, the second evaluation section of the present invention may be evaluation based on a change rate of the number of pre-registered synonyms that are contained in the description of an analysis target Web page.

What is claimed is:

1. A site evaluation system, comprising:
 a page access count acquiring section acquiring a temporal change in the number of accesses for requesting pages, for each of pages that constitute a site for which a page requested by an access over a communication network is transmitted to an access source;
 a page identification section identifying a page for which a temporal change in the number of accesses acquired by said page access count acquiring section exceeds a predetermined criterion;
 a word acquiring section acquiring a temporal change in a word that is contained in the description of the page identified by said page identification section among the pages constituting said site as the description of the page is updated;
 a second evaluation section comparing the temporal change in the number of accesses to the page identified by said page identification section with the temporal change in the word acquired by said word acquiring section, and evaluating the comparison result based on a predetermined evaluation criterion; and
 a second result providing section providing the result of evaluation by said second evaluation section for viewing.

2. The site evaluation system according to claim 1, further comprising:
 a site access count acquiring section acquiring for said site a temporal change in the total number of accesses for requesting pages that constitute said site;
 a first evaluation section comparing the temporal change in the number of accesses to the page identified by said page identification section with the temporal change in the total number of accesses acquired by said site access count acquiring section, and evaluating the comparison result based on a predetermined evaluation criterion; and
 a first result providing section providing the result of evaluation by said first evaluation section for viewing.

3. A site evaluation program storage medium that stores thereon a site evaluation program which comprises:
 a page access count acquiring section acquiring a temporal change in the number of accesses for requesting pages, for each of pages that constitute a site for which a page requested by an access over a communication network is transmitted to an access source;
 a page identification section identifying a page for which a temporal change in the number of accesses acquired by said page access count acquiring section exceeds a predetermined criterion;
 a word acquiring section acquiring a temporal change in a word that is contained in the description of the page identified by said page identification section among the pages constituting said site as the description of the page is updated;
 a second evaluation section comparing the temporal change in the number of accesses to the page identified by said page identification section with the temporal change in the word acquired by said word acquiring section, and evaluating the comparison result based on a predetermined evaluation criterion; and
 a second result providing section providing the result of evaluation by said second evaluation section for viewing.

* * * * *

UNITED STATES PATENT AND TRADEMARK OFFICE
CERTIFICATE OF CORRECTION

| | |
|---|---|
| PATENT NO. | : 7,277,939 B2 |
| APPLICATION NO. | : 11/593060 |
| DATED | : October 2, 2007 |
| INVENTOR(S) | : Masafumi Fukumoto et al. |

It is certified that error appears in the above-identified patent and that said Letters Patent is hereby corrected as shown below:

Please replace issued claim 1 with the following claim 1 (as originally filed in the application, and as allowed)

Col. 19, claim 1, line 56

1. A site evaluation system, comprising:
        a page access count acquiring section acquiring a temporal change in the number of accesses for requesting pages, for each of pages that constitute a site for which a page requested by an access over a communication network is transmitted to an access source;
        a page identification section identifying a page for which a temporal change in the number of accesses acquired by said page access count acquiring section exceeds a predetermined criterion;
        a third evaluation section comparing the temporal change in the number of accesses to the page identified by said page identification section with a temporal change in the number of accesses to a page that is linked to the page, and evaluating the comparison result based on a predetermined evaluation criterion; and
        a third result providing section providing the result of evaluation by said third evaluation section for viewing.

Please replace issued claim 3 with the following claim 3 (as originally filed in the application, and as allowed)

Col. 20, claim 3, line 34

3. A site evaluation program storage medium that stores thereon a site evaluation program which comprises:
        a page access count acquiring section acquiring a temporal change in the number of accesses for requesting pages, for each of pages that constitute a site for which a page requested by an access over a communication network is transmitted to an access source;
        a page identification section identifying a page for which a temporal change in the number of accesses acquired by said page access count acquiring section exceeds a predetermined criterion;

UNITED STATES PATENT AND TRADEMARK OFFICE
CERTIFICATE OF CORRECTION

PATENT NO. : 7,277,939 B2
APPLICATION NO. : 11/593060
DATED : October 2, 2007
INVENTOR(S) : Masafumi Fukumoto et al.

It is certified that error appears in the above-identified patent and that said Letters Patent is hereby corrected as shown below:

a third evaluation section comparing the temporal change in the number of accesses to the page identified by said page identification section with temporal change in the number of accesses to a page that is linked to the page, and evaluating the comparison result based on a predetermined evaluation criterion; and
      a third result providing section providing the result of evaluation by said third evaluation section for viewing.

Signed and Sealed this

Thirtieth Day of December, 2008

JON W. DUDAS
*Director of the United States Patent and Trademark Office*